United States Patent
Manners et al.

(10) Patent No.: US 6,406,658 B1
(45) Date of Patent: Jun. 18, 2002

(54) STEREOLITHOGRAPHIC METHOD AND APPARATUS FOR PRODUCTION OF THREE DIMENSIONAL OBJECTS USING MULTIPLE BEAMS OF DIFFERENT DIAMETERS

(75) Inventors: Chris R. Manners, Moorpark; Michelle D. Guertin, Valencia; Hop D. Nguyen, Quartz Hill; Jouni P. Partanen, Los Angeles; Nansheng Tang, Valencia; Michael A. Everett, Saugus, all of CA (US)

(73) Assignee: 3D Systems, Inc., Valencia, CA (US)

( * ) Notice: Subject to any disclaimer, the term of this patent is extended or adjusted under 35 U.S.C. 154(b) by 0 days.

(21) Appl. No.: 09/248,352

(22) Filed: Feb. 8, 1999

(51) Int. Cl.⁷ .......................... B29C 35/08; B29C 41/02; B29C 17/50; B29C 19/00; G06F 17/50; G06F 19/00

(52) U.S. Cl. .................... 264/401; 425/174.4; 425/375; 700/120

(58) Field of Search ...................... 264/401; 425/174.4, 425/375; 700/120

(56) References Cited

U.S. PATENT DOCUMENTS

| | | |
|---|---|---|
| 4,575,330 A | 3/1986 | Hull |
| 4,752,352 A | 6/1988 | Feygin |
| 4,863,538 A | 9/1989 | Deckard |
| 4,999,143 A | 3/1991 | Hull et al. |
| 5,015,312 A | 5/1991 | Kinzie |
| 5,058,988 A | 10/1991 | Spence |
| 5,059,021 A | 10/1991 | Spence et al. |
| 5,076,974 A | 12/1991 | Modrek et al. |
| 5,089,185 A | 2/1992 | Hirano et al. |
| 5,104,592 A | 4/1992 | Hull et al. |
| 5,121,329 A | 6/1992 | Crump |
| 5,123,734 A | 6/1992 | Spence et al. |
| 5,133,987 A | 7/1992 | Spence et al. |

(List continued on next page.)

FOREIGN PATENT DOCUMENTS

| | | |
|---|---|---|
| JP | 2000-313067 A2 | 11/2000 |
| WO | 95/18009 | 7/1995 |
| WO | 96/12607 | 5/1996 |
| WO | 96/12608 | 5/1996 |
| WO | 96/12609 | 5/1996 |
| WO | 96/12610 | 5/1996 |

OTHER PUBLICATIONS

Jacobs, Paul F., Stereolithography and Other RP&M Technologies From Rapid Prototyping to Rapid Tooling, Society of Manufacturing Engineers, 1996.

Jacobs, Paul F. Rapid Prototyping & Manufacturing Fundamentals of yStereolithography, Society of Manufacturing Engineers, 1992.

U.S. Patent application No. 08/722,335, filed Sep. 27, 1996, by Leyden et al. (now abandoned).

(List continued on next page.)

Primary Examiner—Leo B. Tentoni
(74) Attorney, Agent, or Firm—Ralph D'Alessandro

(57) ABSTRACT

A rapid prototyping and manufacturing (e.g. stereolithography) method and apparatus for making three-dimensional objects on a layer by layer basis by selectively exposing layers of material to prescribed stimulation, using a beam having a first smaller diameter and a beam having a second larger diameter, to form laminae of the object. The power of the smaller beam is typically lower than the power of the larger beam. Object formation is controlled by data representing portions of the layers to be exposed with the larger beam (large spot portions) and those portions to be exposed with the smaller beam (small spot portions). In a preferred embodiment, portions exposed with the larger beam are formed first, for a given layer. Portions are exposed with the small beam next. Thereafter the entire perimeter of the laminae is traced using the small beam. Data manipulation techniques are used to identify which portions may be formed with the large beam to decrease exposure time and which should be formed with the small beam to maintain accuracy of the lamina being formed. More than two beam diameters may be used.

20 Claims, 10 Drawing Sheets

U.S. PATENT DOCUMENTS

| | | |
|---|---|---|
| 5,141,680 A | 8/1992 | Almquist et al. |
| 5,143,663 A | 9/1992 | Almquist et al. |
| 5,174,931 A | 12/1992 | Almquist et al. |
| 5,182,056 A | 1/1993 | Spence et al. |
| 5,182,715 A | 1/1993 | Vorgitch et al. |
| 5,184,307 A | 2/1993 | Hull et al. |
| 5,192,469 A | 3/1993 | Smalley et al. |
| 5,192,559 A | 3/1993 | Hull et al. |
| 5,204,055 A | 4/1993 | Sachs et al. |
| 5,209,878 A | 5/1993 | Smalley et al. |
| 5,234,636 A | 8/1993 | Hull et al. |
| 5,238,639 A | 8/1993 | Vinson et al. |
| 5,256,340 A | 10/1993 | Allison et al. |
| 5,321,622 A | 6/1994 | Snead et al. |
| 5,597,520 A | 1/1997 | Smalley et al. |
| 5,840,239 A | 11/1998 | Partanen et al. |
| 5,902,537 A | 5/1999 | Almquist et al. |
| 5,902,538 A | 5/1999 | Kruger et al. |
| 5,943,235 A | 8/1999 | Earl et al. |
| 5,945,058 A | 8/1999 | Manners et al. |
| 5,965,079 A | 10/1999 | Manners |
| 5,985,204 A | 11/1999 | Otsuka et al. |
| 5,999,184 A | 12/1999 | Smalley et al. |
| 6,001,297 A | 12/1999 | Partanen et al. |
| 6,084,980 A | 7/2000 | Nguyen et al. |
| 6,103,176 A | 8/2000 | Nguyen et al. |

OTHER PUBLICATIONS

U.S. Patent application No. 09/061,796, filed Apr. 16, 1998, by Wu et al. (pending).

U.S. Patent application No. 09/154,967, filed Sep. 17, 1998, by Nguyen et al. (now abandoned).

U.S. Patent application No. 09/246,416, filed Feb. 8, 1999, by Bishop et al. (pending).

U.S. Patent application No. 09/246,504, filed Feb. 8, 1999, by Guertin et al. (pending).

U.S. Patent application No. 09/247,113, filed Feb. 8, 1999, by Chari et al. (pending).

U.S. Patent application No. 09/247,119, filed Feb. 8, 1999, by Kulkarni et al. (pending).

U.S. Patent application No. 09/247,120, filed Feb. 8,1999 by Everett et al. (pending).

U.S. Patent application No. 09/484,984, filed Jan. 1, 2000, by Earl et al. (pending).

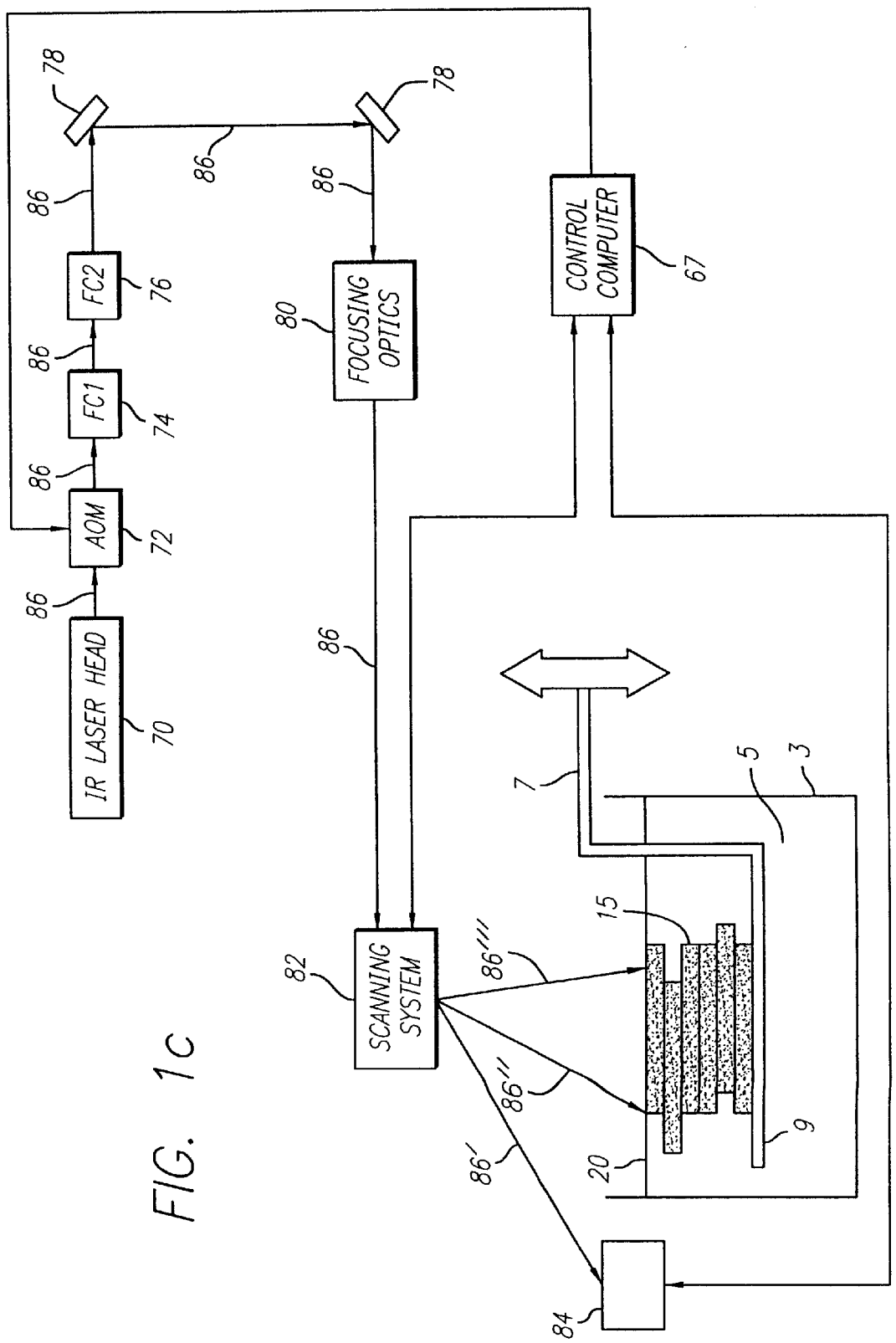

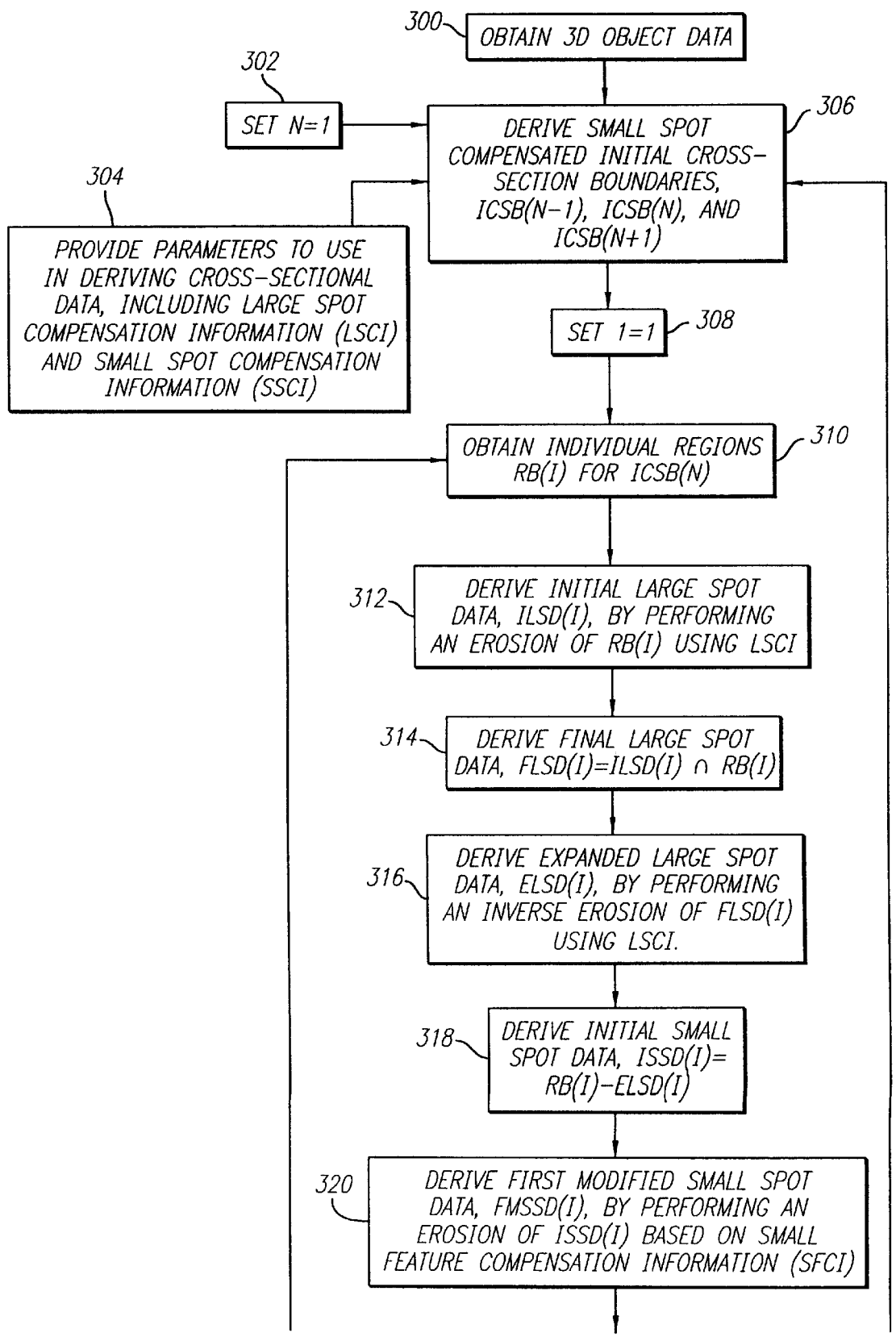
FIG. 3-A

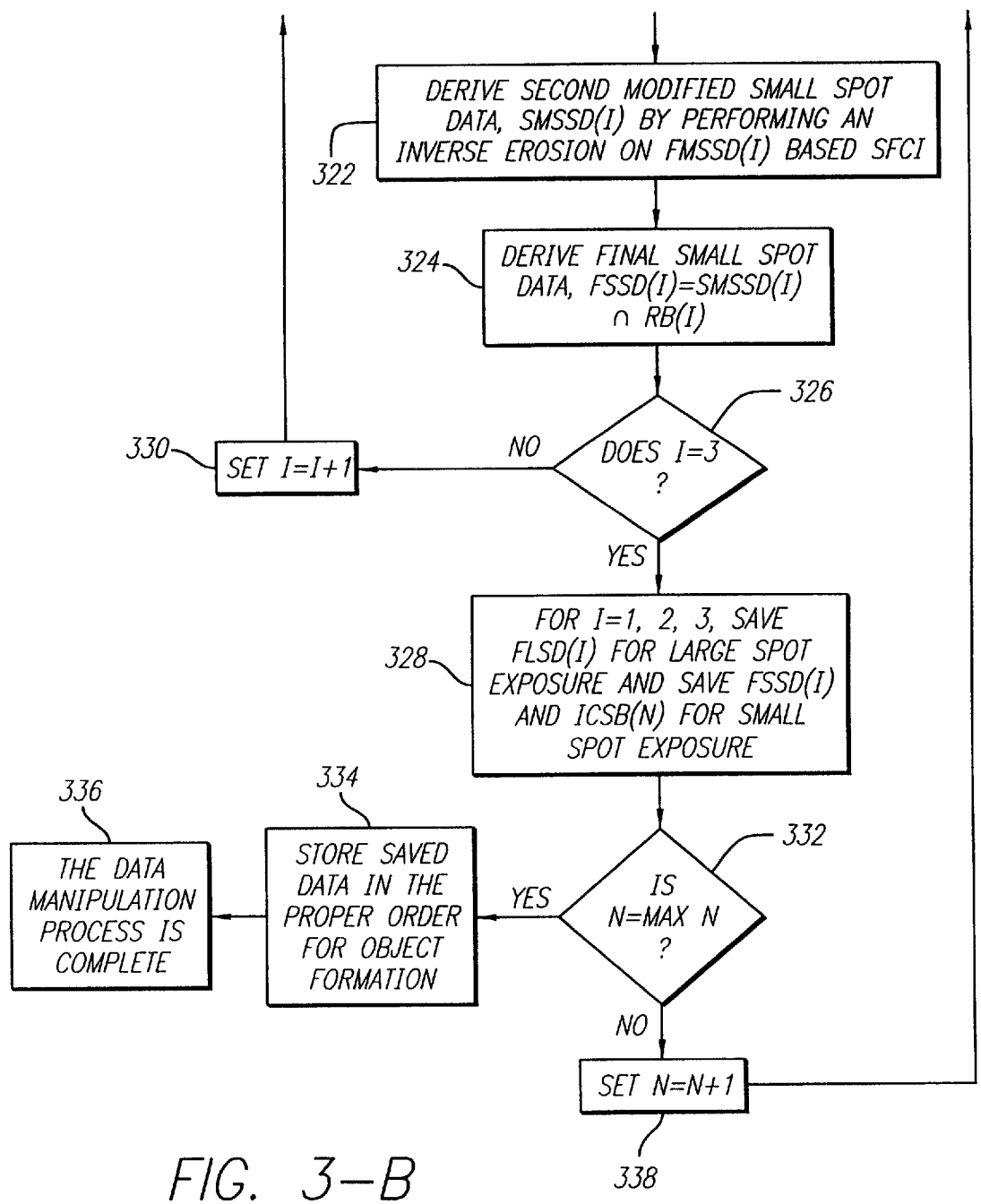
FIG. 3-B

STEREOLITHOGRAPHIC METHOD AND APPARATUS FOR PRODUCTION OF THREE DIMENSIONAL OBJECTS USING MULTIPLE BEAMS OF DIFFERENT DIAMETERS

FIELD OF THE INVENTION

This invention relates to the formation of three-dimensional objects using a Rapid Prototyping and Manufacturing (RP&M) technique. The invention more particularly relates to the stereolithographic formation of three-dimensional objects using a plurality of different dimensioned beams of radiation.

BACKGROUND OF THE INVENTION

1. Related Art

Rapid Prototyping and Manufacturing (RP&M) is the name given to a field of technologies that can be used to form three-dimensional objects rapidly and automatically from three-dimensional computer data representing the objects. RP&M can be considered to include three classes of technologies: (1) Stereolithography, (2) Selective Deposition Modeling, and (3) Laminated Object Manufacturing.

The stereolithography class of technologies creates three-dimensional objects based on the successive formation of layers of a fluid-like material adjacent to previously formed layers of material and the selective solidification of those layers according to cross-sectional data representing successive slices of the three-dimensional object in order to form and adhere laminae (i.e. solidified layers). One specific stereolithography technology is known simply as stereolithography and uses a liquid material that is selectively solidified by exposing it to prescribed stimulation. The liquid material is typically a photopolymer and the prescribed stimulation is typically visible or ultraviolet electromagnetic radiation. The radiation is typically produced by a laser though other sources of radiation are possible such as arc lamps, resistive lamps, and the like. Exposure may occur by scanning a beam or by controlling a flood exposure by use of a light valve that selectively transmits or reflects the radiation. Liquid-based stereolithography is disclosed in various patents, applications, and publications of which a number are briefly described in the Related Applications section hereafter.

Another stereolithography technology is known as Selective Laser Sintering (SLS). SLS is based on the selective solidification of layers of a powdered material by exposing the layers to infrared electromagnetic radiation to sinter or fuse the powder particles. SLS is described in U.S. Pat. No. 4,863,538, issued Sep. 5, 1989, to Deckard. A third technology is known as Three Dimensional Printing (3DP). 3DP is based on the selective solidification of layers of a powdered material which are solidified by the selective deposition of a binder thereon. 3DP is described in U.S. Pat. No. 5,204,055, issued Apr. 20, 1993, to Sachs.

The present invention is primarily directed to stereolithography using liquid-based building materials (i.e. medium). It is believed, however, that the techniques of the present invention may have application in the other stereolithography technologies in order to achieve faster object formation times and/or higher object resolution.

Selective Deposition Modeling, SDM, involves the build-up of three-dimensional objects by selectively depositing solidifiable material on a lamina-by-lamina basis according to cross-sectional data representing slices of the three-dimensional object. One such technique is called Fused Deposition Modeling, FDM, and involves the extrusion of streams of heated, flowable material which solidify as they are dispensed onto the previously formed laminae of the object. FDM is described in U.S. Pat. No. 5,121,329, issued Jun. 9, 1992, to Crump. Another technique is called Ballistic Particle Manufacturing, BPM, which uses a 5-axis, ink-jet dispenser to direct particles of a material onto previously solidified layers of the object. BPM is described in PCT publication numbers WO 96-12607, published May 2, 1996, by Brown; WO 96-12608, published May 2, 1996, by Brown; WO 96-12609, published May 2, 1996, by Menhennett; and WO 96-12610, published May 2, 1996, by Menhennett. A third technique is called Multijet Modeling, MJM, and involves the selective deposition of droplets of material from multiple ink jet orifices to speed the building process. MJM is described in U.S. Pat. No. 5,943,235 issued Aug. 24, 1999 to Earl et al. and U.S. patent application Ser. No. 08/722,335, filed Sep. 27, 1996, by Leyden et al., now abandoned.

Though, as noted above, the techniques of the instant invention are directed primarily to liquid-based stereolithography object formation, it is believed that the techniques may have application in the SDM technologies to enhance object resolution and/or to decrease object formation times.

Laminated Object Manufacturing, LOM, techniques involve the formation of three-dimensional objects by the stacking, adhering, and selective cutting of sheets of material, in a selected order, according to the cross-sectional data representing the three-dimensional object to be formed. LOM is described in U.S. Pat. No. 4,752,352, issued Jun. 21, 1988, to Feygin, U.S. Pat. No. 5,015,312, issued May 14, 1991, to Kinzie, and U.S. Pat. No. 5,192,559, issued Mar. 9, 1993, to Hull et al.; and in PCT Publication No. WO 95-18009, published Jul. 6, 1995, by Morita.

It is believed that the techniques of the present invention may have application in the LOM technologies to enhance object resolution when using a laser beam or mechanical cutting tool to cutout cross-sections and dissecting or sublimating the non-cross-section regions.

Various techniques for enhancing object formation speed have been described previously. In particular various techniques have been described in U.S. Pat. No. 5,089,185, issued Feb. 18, 1992 to Hirano. This patent describes the use of a large diameter light flux for a section having a thickness larger than the diameter of the light flux and using a small diameter light flux for sections having a thickness smaller than the diameter of the light flux having the large diameter. This patent indicates, inter alia, that the light flux having the small diameter is connected to a low power laser source while the light flux having the large diameter is connected to a high power laser source.

Though this patent teaches the desire to use a large diameter light flux and a small diameter light flux, it fails to provide any teachings concerning how to manipulate object data to distinguish regions requiring the small diameter light flux and those capable of being formed using the large diameter light flux. This reference further fails to teach the desirability of distinguishing cross-sectional regions from one another when determining where to apply the large diameter and small diameter light fluxes.

A need remains in the art for techniques that allow automatic, effective, and reliable utilization of multiple beams having different diameters.

2. Other Related Patents and Applications

The patents, applications, and publications mentioned above and hereafter are all incorporated by reference herein as if set forth in full. Table 1 provides a listing of patents and applications co-owned by the assignee of the instant application. A brief description of subject matter found in each patent and application is included in the table to aid the reader in finding specific types of teachings. It is not intended that the incorporation of subject matter be limited to those topics specifically indicated, but instead the incorporation is to include all subject matter found in these applications and patents. The teachings in these incorporated references can be combined with the teachings of the instant application in many ways. For example, the references directed to various data manipulation techniques may be combined with the teachings herein to derive even more useful, modified object data that can be used to more accurately and/or efficiently form objects. As another example, the various apparatus configurations disclosed in these references may be used in conjunction with the novel features of the instant invention.

TABLE 1

Related Patents and Applications

| Patent No. Issue Date Application No. Filing Date | Inventor | Subject |
|---|---|---|
| 4,575,330 Mar 11, 1986 06/638,905 Aug 8, 1984 | Hull | Discloses fundamental elements of stereolithography. |
| 4,999,143 Mar 12, 1991 07/182,801 Apr 18, 1988 | Hull, et al. | Discloses various removable support structures applicable to stereolithography. |
| 5,058,988 Oct 22, 1991 07/268,816 Nov 8, 1988 | Spence | Discloses the application of beam profiling techniques useful in stereolithography for determining cure depth and scanning velocity, etc. |
| 5,059,021 Oct 22, 1991 07/268,907 Nov 8, 1988 | Spence, et al. | Discloses the utilization of drift correction techniques for eliminating errors in beam positioning resulting from instabilities in the beam scanning system |
| 5,076,974 Dec 31, 1991 07/268,429 Nov 8, 1988 | Modrek, et al. | Discloses techniques for post processing objects formed by stereolithography. In particular exposure techniques are described that complete the solidification of the building material. Other post processing steps are also disclosed such as steps of filling in or sanding off surface discontinuities. |
| 5,104,592 Apr 14, 1992 07/339,246 Apr 17, 1989 | Hull | Discloses various techniques for reducing distortion, and particularly curl type distortion, in objects being formed by stereolithography. |
| 5,123,734 Jun 23, 1992 07/268,837 Nov 8, 1988 | Spence, et al. | Discloses techniques for calibrating a scanning system. In particular techniques for mapping from rotational mirror coordinates to planar target surface coordinates are disclosed |
| 5,133,987 Jul 28, 1992 07/427,885 Oct 27, 1989 | Spence, et al. | Discloses the use of a stationary mirror located on an optical path between the scanning mirrors and the target surface to fold the optical path in a stereolithography system. |
| 5,141,680 Aug 25, 1992 07/592,559 Oct 4, 1990 | Almquist, et al. | Discloses various techniques for selectively dispensing a material to build up three-dimensional objects. |
| 5,143,663 Sep 1, 1992 07/365,444 Jun 12, 1989 | Leyden, et al. | Discloses a combined stereolithography system for building and cleaning objects. |
| 5,174,931 Dec 29, 1992 07/515,479 Apr 27, 1990 | Almquist, et al. | Discloses various doctor blade configurations for use in forming coatings of medium adjacent to previously solidified laminae. |

TABLE 1-continued

Related Patents and Applications

| Patent No. Issue Date Application No. Filing Date | Inventor | Subject |
|---|---|---|
| 5,182,056 Jan 26, 1993 07/429,911 Oct 27, 1989 | Spence, et al. | Discloses the use of multiple wavelengths in the exposure of a stereolithographic medium. |
| 5,182,715 Jan 26, 1993 07/824,819 Jan 22, 1992 | Vorgitch, et al. | Discloses various elements of a large stereolithographic system. |
| 5,184,307 Feb 2, 1993 07/331,644 Mar 31, 1989 | Hull, et al. | Discloses a program called Slice and various techniques for converting three-dimensional object data into data descriptive of cross-sections. Disclosed techniques include line width compensation techniques (erosion routines), and object sizing techniques. The application giving rise to this patent included a number of appendices that provide further details regarding stereolithography methods and systems. |
| 5,192,469 Mar 9, 1993 07/606,802 Oct 30, 1990 | Hull et al. | Discloses various techniques for forming three-dimensional object from sheet material by selectively cutting out and adhering laminae. |
| 5,209,878 May 11, 1993 07/605,979 Oct 30, 1990 | Smalley, et al. | Discloses various techniques for reducing surface discontinuities between successive cross-sections resulting from a layer-by-layer building technique. Disclosed techniques include use of fill layers and meniscus smoothing. |
| 5,234,636 Aug 10, 1993 07/929,463 Aug 13, 1992 | Hull, et al. | Discloses techniques for reducing surface discontinuities by coating a formed object with a material, heating the material to cause it to become flowable, and allowing surface tension to smooth the coating over the object surface. |
| 5,238,639 Aug 24, 1993 07/939,549 Mar 31, 1992 | Vinson, et al. | Discloses a technique for minimizing curl distortion by balancing upward curl to downward curl. |
| 5,256,340 Oct 26, 1993 07/906,207 Jun 25, 1992 and 08/766,956 Dec 16, 1996 | Allison, et al. | Discloses various build/exposure styles for forming objects including various techniques for reducing object distortion. Disclosed techniques include: (1) building hollow, partially hollow, and solid objects, (2) achieving more uniform cure depth, (3) exposing layers as a series of separated tiles or bullets, (4) using alternate sequencing exposure patterns from layer to layer, (5) using staggered or offset vectors from layer to layer, and (6) using one or more overlapping exposure patterns per layer. |
| 5,321,622 Jun 14, 1994 07/606,191 Oct 30, 1990 | Snead, et al. | Discloses a computer program known as CSlice which is used to convert three-dimensional object data into cross-sectional data. Disclosed techniques include the use of various Boolean operations in stereolithography. |
| 5,597,520 Jan 28, 1997 08/233,027 Apr 25, 1994 and 08/428,951 Apr 25, 1995 | Smalley, et al. | Discloses various exposure techniques for enhancing object formation accuracy. Disclosed techniques address formation of high resolution objects from building materials that have a Minimum Solidification Depth greater than one layer thickness and/or a Minimum Recoating Depth greater than the desired object resolution. |
| 08/722,335 Sep 27, 1996 now abandoned | Leyden, et al. | Discloses build and support styles for use in a Multi-Jet Modeling selective deposition modeling system. |

TABLE 1-continued

Related Patents and Applications

| Patent No. Issue Date Application No. Filing Date | Inventor | Subject |
|---|---|---|
| 5,943,235 Aug 24, 1999 08/722,326 Sep 27, 1996 | Earl et al. | Discloses data manipulation and system control techniques for use in a Multi-Jet Modeling selective deposition modeling system. |
| 5,902,537 May 11, 1999 08/790,005 Jan 28, 1997 | Almquist, et al. | Discloses various recoating techniques for use in stereolithography. Disclosed techniques include 1) an ink jet dispensing device, 2) a fling recoater, 3) a vacuum applicator, 4) a stream recoater, 5) a counter rotating roller recoater, and 6) a technique for deriving sweep extents. |
| 5,840,239 Nov 24, 1998 08/792,347 Jan 31, 1997 | Partanen, et al. | Discloses the application of solid-state lasers to stereolithography. Discloses the use of a pulsed radiation source for solidifying layers of building material and in particular the ability to limit pulse firing locations to only selected target locations on a surface of the medium. |
| 6,001,297 Dec 14, 1999 08/847,855 Apr 28, 1997 | Partanen, et al. | Discloses the stereolithographic formation of objects using a pulsed radiation source where pulsing occurs at selected positions on the surface of a building material. |
| 6,084,980 Jul 4 2000 08/855,125 May 13, 1997 | Nguyen, et al. | Discloses techniques for interpolating originally supplied cross-sectional data descriptive of a three-dimensional object to produce modified data descriptive of the three-dimensional object including data descriptive of intermediate regions between the originally supplied cross-sections of data. |
| 5,945,058 Aug 31, 1999 08/854,950 May 13, 1997 | Manners, et al. | Discloses techniques for identifying features of partially formed objects. Identifiable features include trapped volumes, effective trapped volumes, and solid features of a specified size. The identified regions can be used in automatically specifying recoating parameters and or exposure parameters |
| 5,902,538 May 11, 1999 08/920,428 Aug 29, 1997 | Kruger, et al. | Discloses simplified techniques for making high-resolution objects utilizing low-resolution materials that are limited by their inability to reliably form coatings of a desired thickness due to a Minimum Recoating Depth (MRD) limitation. Data manipulation techniques define layers as primary or secondary. Recoating techniques are described which can be used when the thickness between consecutive layers is less than a leading edge bulge phenomena. |
| 6,157,663 Dec 5, 2000 09/061,796 Apr 16, 1998 | Wu, et al. | Discloses use of frequency converted solid state lasers in stereolithography. |
| 09/154,967 Sep 17, 1998 now abandoned | Nguyen, et al. | Discloses techniques for stereolithographic recoating using a sweeping recoating device that pause and/or slows down over laminae that are being coated over. |
| 09/484,984 Jan 18, 2000 | Earl, et al. | Entitled "Method and Apparatus for Forming Three Dimensional Objects Using Line Width Compensation with Small Feature Retention." Discloses techniques for forming objects while compensating for solidification width induced in a building material by a beam of prescribed stimulation. |
| 09/246,504 Feb 8, 1999 | Guertin, et al. | Entitled "Method and Apparatus for Stereolithographically Forming Three Dimensional Objects With Reduced Distortion." Discloses techniques for forming objects wherein a delay is made to occur between successive exposures of a selected region of a layer. |
| 09/248,352 Feb 8, 1999 | Manners, et al. | Entitled "Stereolithographic Method and Apparatus for Production of Three Dimensional Objects Using Recoating Parameters for Groups of Layers." Discloses improved techniques for managing recoating parameters when forming objects using layer thicknesses smaller than a minimum recoating depth (MRD) and treating some non-consecutive layers as primary layers and treating intermediate layers there between as secondary layers. |
| 6,261,077 Jul 17, 2001 09/246,416 Feb 8, 1999 | Bishop, et al. | Entitled "Rapid Prototyping Apparatus with Enhanced Thermal and Vibrational Stability for Production of Three Dimensional Objects." Discloses an improved Stereolithographic apparatus structure for isolating vibration and/or extraneous heat producing components from other thermal and vibration sensitive components. |
| 6,153,142 Nov 28, 2000 09/247,113 Feb 8, 1999 | Chari, et al. | Entitled "Stereolithographic Method and Apparatus for production of Three Dimensional Objects with Enhanced thermal Control of the Build environment. Discloses improved stereolithographic techniques for maintaining build chamber temperature at a desired level. The techniques include varying heat production based on the difference between a detected temperature and the desired temperature. |
| 6,241,934 B1 Jun 5, 2001 09/247,120 Feb 8, 1999 | Everett, et al. | Entitled "Stereolithographic Method and Apparatus for production of Three Dimensional Objects Including Enhanced Control of Prescribed Stimulation Production." Discloses techniques forming objects using varying production of prescribed stimulation (e.g. UV radiation)and enhanced scanning control. Production is reduced or eliminated during non-exposure periods (e.g. recoating, z-wait, and pre-dip delay). Production is set to a desired level based on the type of exposure that is desired. Scanning speed is set based on a number of criteria. Transition between successive exposure vectors may be made with multiple intervening non-exposure vectors. The laser power is set using an AOM in combination with a temporary detection of beam power. |
| 6,159,411 Dec 12, 2000 09/247,119 Feb 8, 1999 | Kulkarni, et al. | Entitled "Stereolithographic Method and Apparatus for Production of Three Dimensional Objects Including Simplified Build Preparation." Discloses techniques for forming objects using a simplified data preparation process. Selection of the various parameter styles needed to form an object is reduced to answering several questions from lists of possible choices. |

The following two books are also incorporated by reference herein as if set forth in full: (1) *Rapid Prototyping and Manufacturing: Fundamentals of Stereolithography*, by Paul F. Jacobs; published by the Society of Manufacturing Engineers, Dearborn Mich.; 1992; and (2) *Stereolithography and other RP&M Technologies: from Rapid Prototyping to Rapid Tooling*; by Paul F. Jacobs; published by the Society of Manufacturing Engineers, Dearborn Mich.; 1996.

SUMMARY OF THE INVENTION

It is a first object of the invention to provide enhanced techniques for forming three-dimensional objects using RP&M technologies.

It is a second object of the present invention to provide three-dimensional objects with reduced object formation time.

It is a third object of the present invention to provide three-dimensional objects with enhanced resolution.

It is a fourth object of the invention to provide data for controlling object formation when using forming techniques with different dimensions.

It is intended that the above noted objects be addressed individually as well as in various combinations.

A first aspect of the invention is to provide a method of forming a three-dimensional object from a plurality of adhered laminae by exposing successive layers of a material to a beam of prescribed stimulation, including: (1) providing data representing a three-dimensional object; (2) providing a first beam of prescribed stimulation having a first dimension; (3) providing a second beam of prescribed stimulation having a second dimension larger than the first dimension; (4) manipulating the data to form modified object data for forming the three-dimensional object, the modified data including data indicative of cross-sectional portions to be formed using the beam having the second. dimension and indicative of cross-sectional portions to be formed using the beam having the first dimension; (5) forming a layer of material adjacent to any last formed layer of material in preparation for forming a subsequent lamina of the object; (6) exposing the material to the first beam and/or the second beam in accordance with the modified data to form a successive lamina of the object; and (7) repeating the acts of forming and exposing a plurality of times in order to form the object from a plurality of adhered laminae.

A second aspect of the invention is to provide an apparatus for forming a three-dimensional object from a plurality of adhered laminae by exposing successive layers of a material to a beam of prescribed stimulation, including: (1) means for receiving data representing a three-dimensional object; (2) means for providing a first beam of prescribed stimulation having a first dimension; (3) means for providing a second beam of prescribed stimulation having a second dimension larger than the first dimension; (4) means for manipulating the data to form modified object data for forming the three-dimensional object, the modified data including data indicative of cross-sectional portions to be formed using the beam having the second dimension and indicative of cross-sectional portions to be formed using the beam having the first dimension; (5) means for forming a layer of material adjacent to any last formed layer of material in preparation for forming a subsequent lamina of the object; (6) means for exposing the material to the first beam and/or the second beam in accordance with the modified data to form a successive lamina of the object; and (7) means for operating the means for forming and the means for exposing to form the object from a plurality of adhered laminae.

A third aspect of the invention is to provide an apparatus for forming a three-dimensional object from a plurality of adhered laminae by exposing successive layers of a material to a beam of prescribed stimulation, including: (1) a memory for receiving data representing a three-dimensional object; (2) a source of a first beam of prescribed stimulation, the first beam having a first dimension; (3) a source of a second beam of prescribed stimulation, the second beam having a second dimension larger than the first dimension; (4) a computer programmed to manipulate the data to form modified object data for forming the three-dimensional object, the modified data including data indicative of cross-sectional portions to be formed using the beam having the second dimension and indicative of cross-sectional portions to be formed using the beam having the first dimension; (5) a recoating system for forming a layer of material adjacent to any last formed layer of material in preparation for forming a subsequent lamina of the object; (6) a scanning system for exposing the material to the first beam and/or the second beam in accordance with the modified data to form a successive lamina of the object; and (7) a control system for operating the recoating system and the scanning system to form the object from a plurality of adhered laminae.

Additional objects and aspects of the invention will be clear from the embodiments and their alternatives described below in conjunction with the FIGS. associated therewith. Further aspects of invention involve the practice of the above referred to aspects of the invention in combination with one another.

BRIEF DESCRIPTION OF DRAWINGS

FIG. 1c depicts a block diagram illustrating some major components of the stereolithography system.

FIG. 3 depicts a flow chart outlining a preferred process for manipulating object data to derive layer portions to be exposed with a larger beam and a smaller beam.

DESCRIPTION OF PREFERRED EMBODIMENTS OF THE INVENTION

Figure 1A:
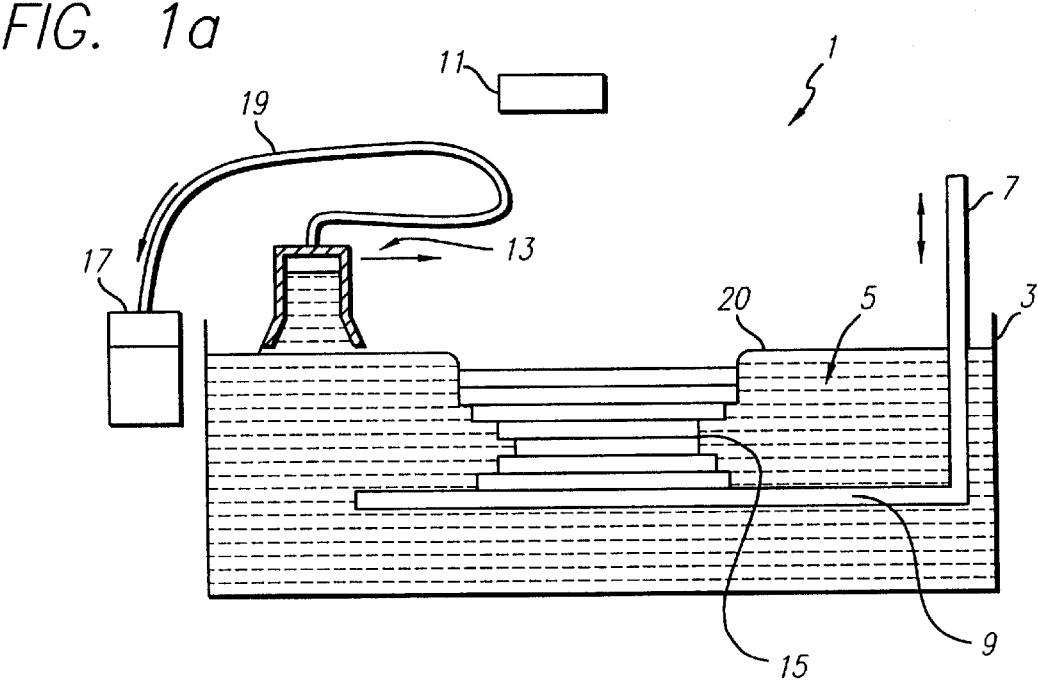
FIGS. 1a and 1b depict side views of a stereolithography apparatus for practicing the instant invention.
Figure 1B:
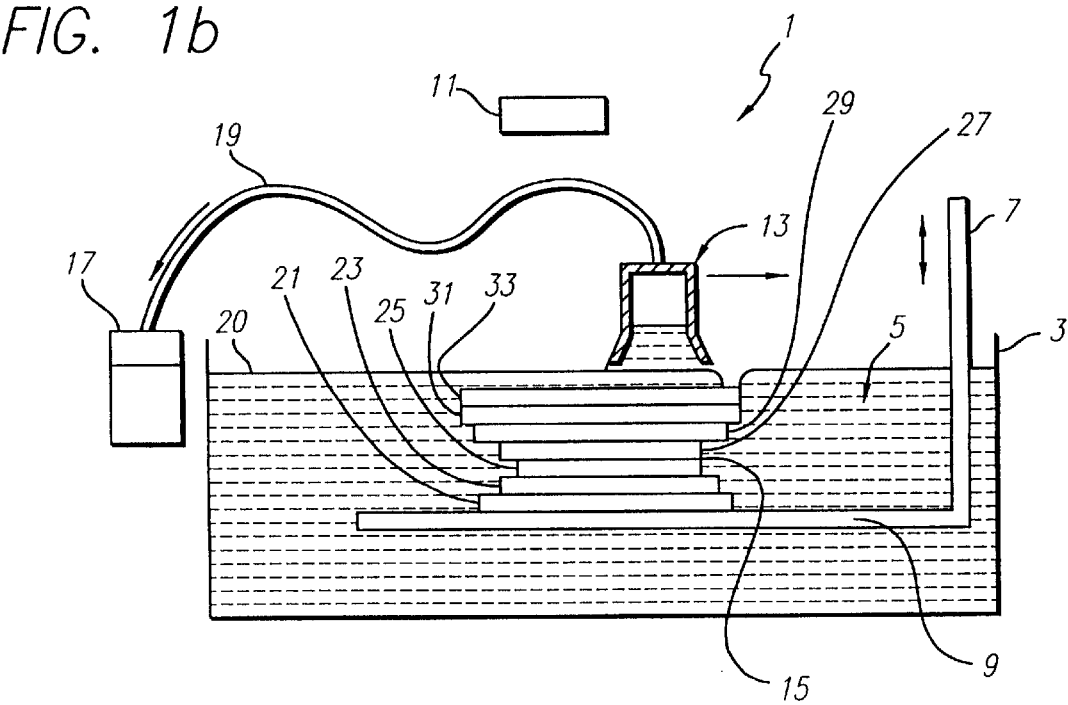

FIGS. 1a and 1b depict schematic representations of a preferred stereolithography apparatus 1 (SLA) for use with the instant invention. The basic components of an SLA® system are described in U.S. Pat. Nos. 4,575,330; 5,184,307; and 5,182,715 as referenced above. The preferred SLA® system includes container 3 for holding building material 5 (e.g. photopolymer) from which object 15 will be formed, elevator 7 and driving means (not shown), elevator platform 9, exposure system 11, recoating bar 13 and driving means (not shown), at least one computer (not shown) for manipulating object data (as needed) and for controlling the exposure system, elevator, and recoating device.

FIG. 1a depicts the partially formed object as having its most recently formed lamina lowered to a position approximately one layer thickness below the desired level of the upper surface of the building material 5 (i.e. desired working surface). As the layer thickness is small and the building material very viscous, FIG. 1a indicates that the material has not flowed significantly across the last formed lamina even after lowering the platform 9. FIG. 1b depicts the coating bar 13 as being swept part way across the previously formed lamina and that the next layer of building material has been partially formed.

A preferred exposure system is described in several of the patents and applications referenced above including U.S. Pat. Nos. 5,058,988; 5,059,021; 5,123,734; 5,133,987; 5,840,239; and Ser. No. 09/248,352. This preferred system includes a laser, a beam focusing system, and a pair of computer controlled XY rotatable scanning mirrors of either the motor driven or galvanometer type.

FIG. 1c provides a block diagram of selected elements of a preferred stereolithography system 1 wherein like elements are identified with like numerals. The exposure system includes an IR laser head 70, that produces a pulsed beam of radiation operating at a desired pulse repetition rate (e.g., 22.5–40 KHz). The exposure system further includes, an AOM 72, a first frequency conversion crystal 74, a second frequency conversion crystal 76, two folding mirrors 78, focusing optics 80, a pair of XY scanning mirrors 82, and a detector 84. A control computer 67 is provided to preferably control, among other things, the scanning mirrors 82, the AOM 72, the detector 84, and the focusing optics 80. The optical path is depicted with reference numeral 86. The computer preferably controls the above noted components based on object data that has been modified for stereolithographic formation. It is preferred that the focusing optics 80 be controlled to produce two or more beam diameters for forming object laminae. The AOM 72 is preferably controlled to adjust beam power based on a plurality of criteria including beam size.

The scanning mirrors are used to selectively direct the beam path to desired locations onto the surface of the building material 5 or onto other items such as detector 84. The optical path beyond the scanning mirrors is depicted with reference numerals 86', 86", or 86'" as examples of the different directions in which the bear may be directed. The AOM is used to set the beam power that is allowed to proceed from the IR laser head 70 to the first and second frequency conversion crystals. The beam that is allowed to proceed to the frequency conversion crystals is sent along a first order beam path from the AOM. The other beam path orders (e.g. $0^{th}$ and $2^{nd}$) are inhibited from progressing to the frequency conversion crystals. The focusing optics are used to obtain a desired focus and/or beam diameter at the surface 20 of the building material 5.

Figure 1D:
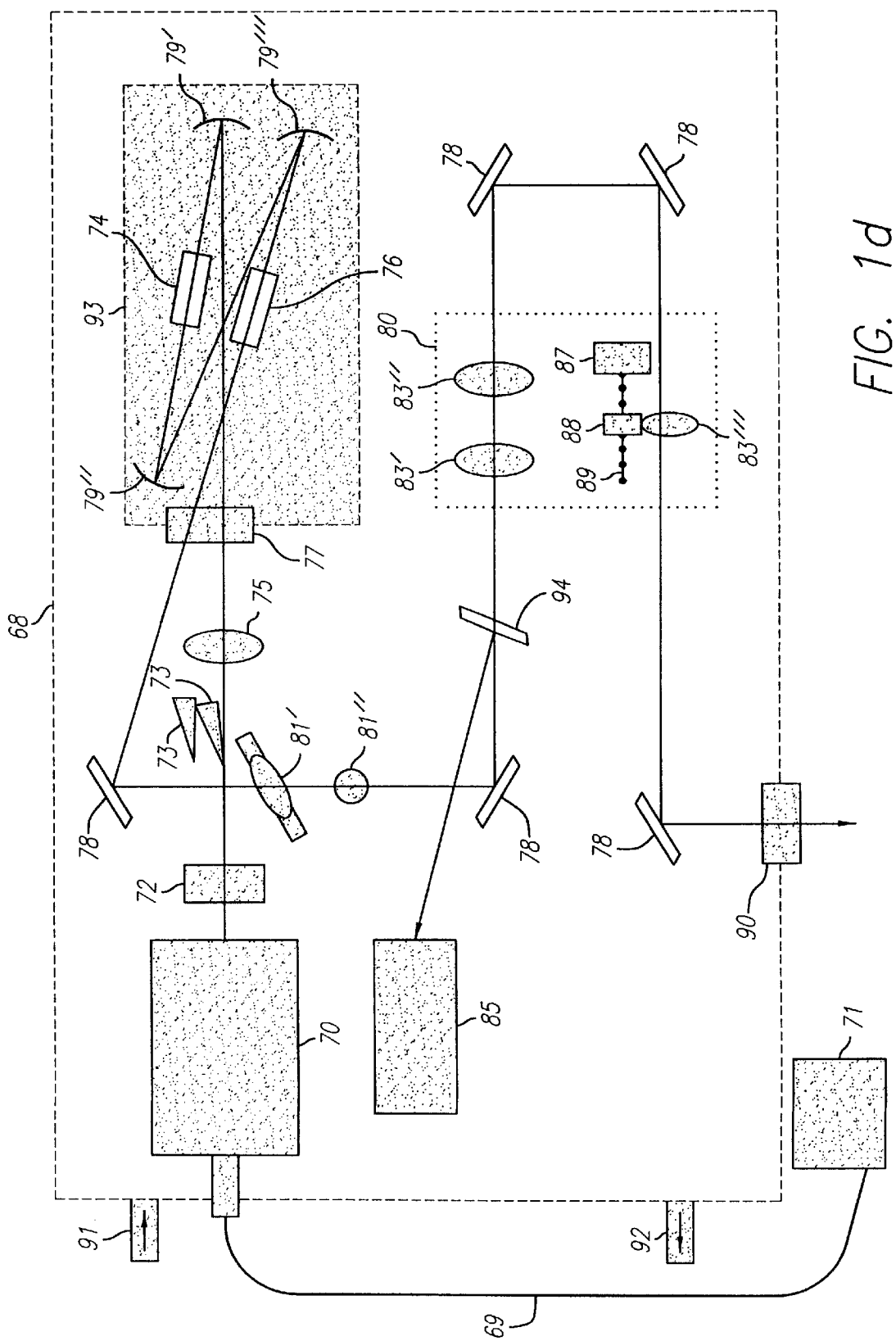
FIG. 1d depicts a schematic diagram illustrating the major components in the laser head and the beam path followed through the laser head.

A more detailed depiction of the beam-generating portion of the exposure system is depicted in FIG. 1d wherein like numerals to those used in the other figures depict similar components. The radiation-generating portion of the exposure system comprises a laser head 68, IR generating laser diodes 71, and a fiber optic cable 69. The laser diodes produce approximately 808 nm radiation at approximately 18 watts. The fiber optic cable directs the output of the laser diodes 71 to an IR laser 70 inside the UV laser head, the radiation from the fiber optic is used to supply pumping radiation to the IR laser 70. The laser 70 produces 1.064 micron radiation that is directed to acousto-optic modulator (AOM) 72 that is used to control the beam power by deflecting varying amounts of the beam power along different optical paths. A zeroth order optical path directs the beam into a trap formed by two triangular shaped elements 73. A first order optical path directs the beam through a half-wave plate 75 that rotates the polarization of the beam.

From the half wave plate 75 the beam enters a frequency conversion module 93 through an aperture 77. From aperture 77 the beam proceeds to focusing mirror 79'. From mirror 79' the beam proceeds through a first frequency conversion crystal 74. This first crystal 74 converts a portion of the first beam into a beam that has double the frequency. The remaining portion of the original beam and the beam of doubled frequency proceed to second focusing mirror 79", then a third focusing mirror 79''', and then through a second frequency conversion crystal 76. The second crystal 76 generates a third beam of tripled frequency compared to the original beam that entered first crystal 74. A beam containing all three frequencies then proceeds out of the conversion module 93 through aperture 77. The mirrors 78 and other optical elements are wavelength selective and cause the remaining portions of the original and doubled frequency beams to attenuate. As such, only the tripled frequency portion of the beam proceeds along the rest of the beam path through laser head 68.

From aperture 77 the beam proceeds to folding mirror 78, and continues through cylindrical lens 81' and 81". The cylindrical lenses are used to remove astigmatism and in excess ellipticity from the beam. Excess ellipticity is determined based on an aspect ratio of the beam that is defined as the ratio of minimum beam dimension at a focal plane and the maximum beam dimension at the focal plane. An aspect ratio of one implies the beam is circular while an aspect ratio of 1.1 or 0.9 implies that the width of the beam in one dimension is approximately 10% greater than or less than the width in the other dimension. Aspect ratios in excess of 1.1 or 0.9 are generally considered excessive though in some circumstances the beams may be useable.

From cylindrical lens 81' the beam proceeds to folding mirror 78. Most of the beam then proceeds through beam splitter 94, while a very small portion (e.g. around 1–4%) is reflected from the beam splitter back to detector 85 where a power measurement may be taken which can then be used in determining the overall power in the beam. The main portion of the beam moves through a lenses 83' and 83" in the beam focusing module 80. After passing through lens 83" the beam direction is reoriented by two folding mirrors 78.

The beam then reenters the focusing module and passes through movable lens 83'''. The position of lens 83''' is controlled by stepper motor 87, moveable mount 88, and dive screw 89. The motor is computer controlled so that the beam focal plane may be varied depending on the desired beam size at the surface of the building material.

It is preferred that the focus system be precalibrated so that adjustment from one beam size to another may be accomplished without delay. In this regard it is preferred that an encoder provide stepper motor position and that the computer contain a table of encoder positions corresponding to different desired beam sizes. Based on values in the look up table the stepper motor can be commanded to move to a new position based on a difference between present position and desired position. Once the new position is reached, if desired, the actual beam diameter may be checked using a beam profiling system as described in previously referenced U.S. Pat. No. 5,058,988. Various alternative approaches to setting beam size will be apparent to those of skill in the art.

The beam then proceeds to folding mirror 78 and out exit window 90 where after the beam encounters the scanning mirrors or other optical components. The beam produced by this laser head is pulsed at a useable frequency (e.g. 22.5–40 KHz or more). The laser head is preferably water cooled by passing water in through the base plate that supports the components depicted in FIG. 1*d*. The water preferably enters the plate through orifice 91 proceeds along a winding flow path and then exits the plate at orifice 92.

A laser power supply may be used to control operation of the laser in several ways: (1) it supplies a desired amount of electric power to the laser diodes 71 to produce a desired optical output (e.g. about 18 watts), (2) it controls thermal electric heaters/coolers or other heaters/coolers to control the temperatures of the laser diodes, the IR laser, and/or the conversion crystals, (3) it may control the AOM, (4) it may control the focusing system, (5) it may be used to control the detector and to interpret signals therefrom. Alternatively, or additionally, the process computer may be used to control one or more of the above noted elements. The process computer preferably is functionally connected to the laser power supply so that it may further control laser operation.

A preferred laser head, IR module, and power supply is sold by Spectra-Physics of Mountain View, Calif., as part number J30E-BL10-355Q-11 or J30E-BL6-355Q11.

The water passing through the base plate is also preferably used to cool the IR laser diodes 71. It is preferred that the water pass through the base plate prior to passing on to the laser diodes 71. The water may be recirculated through an enclosed cooling system or other recirculating or non-recirculating system. Various alternatives to water cooling are possible and will be apparent to those of skill in the art.

Preferred control and data manipulation systems and software are described in a number of the patents referenced above, including U.S. Pat. Nos. 5,184,307; 5,321,622; and 5,597,520.

A preferred recoating device is described in U.S. Pat. No. 5,902,537 as referenced above and includes recoater bar 13, regulated vacuum pump 17, and vacuum line 19 connecting the bar 13 and the pump 17.

Other components of a preferred SLA® system (not shown) may include a liquid level control system, a build chamber, an environmental control system including a temperature control system, safety interlocks, a viewing device, and the like.

SLA® systems on which the instant invention can be utilized are available from 3D Systems, Inc. of Valencia, Calif. These SLA® systems include the SLA-250 using a CW HeCd laser operating at 325 nm, the SLA-3500, SLA-5000, and the SLA-7000 using a solid state lasers operating at 355 nm with a pulse repetition rates of 22.5 KHz, 40 Kz, and 25 KHz, respectively. Preferred building materials are photopolymers manufactured by CIBA Specialty Chemicals of Los Angeles, Calif., and are available from 3D Systems, Inc. These materials include SL 5170, SL 5190, and SL 5530HT.

The typical operation of an SLA® system involves alternating formation of coatings of material (i.e. layers of material) and the selective solidification of those coatings to form an object from a plurality of adhered laminae. The process may conceptually be viewed as beginning with the elevator platform 9 immersed one layer thickness below the upper surface 20 of the photopolymer 5. The coating of photopolymer is selectively exposed to prescribed stimulation (e.g. a beam of UV radiation) which cures the material to a desired depth to form an initial lamina of the object adhered to the elevator platform. This initial lamina corresponds to an initial cross-section of the object to be formed or corresponds to an initial cross-section of supports that may be used to adhere the object to the platform. After formation of this initial lamina, the elevator platform and adhered initial lamina are lowered a net amount of one layer thickness into the material.

Hereinafter, layer thickness and other units of distance may be expressed in any of three units: (1) inches, (2) milli-inches (i.e. mils), or (3) millimeters. As the material is typically very viscous and the thickness of each layer is very thin (e.g. 4 mils to 10 mils), the material may not readily form a coating over the last solidified lamina (as shown in FIG. 1*a*). In the case where a coating is not readily formed, a recoating device may be swept at or somewhat above the surface of the building material (e.g. liquid photopolymer) to aid in the formation of a fresh coating. The coating formation process may involve the sweeping of the recoating bar one or more times at a desired velocity.

After formation of this coating, the second layer is solidified by a second exposure of the material to prescribed stimulation according to data representing a second cross-section of the object. This process of coating formation and solidification is repeated over and over again until the object is formed from a plurality of adhered layers (21, 23, 25, 27, 29, 31, and 33).

In some building techniques, incomplete solidification of some or all object cross-sections may occur. Alternatively, in some processes an object lamina associated with a given layer (i.e. a lamina whose location should be positioned, relative to the rest of the object, at the level corresponding to that layer of material) may not be exposed or may be only partially exposed in association with that layer (i.e. when that layer is located at the surface of the liquid). Instead, that lamina may be formed in whole or in part in association with a subsequently formed layer wherein the exposure applied to this subsequent layer is such as to cause material transformation to such an extent as to cause solidification in the material at the level of the associated cross-section. In other words, the layer which is associated with a given lamina may not be the layer in association with which the lamina will be solidified. It may be said that the layer in association with which a lamina or portion of a lamina is formed, is that layer which is located at the surface of material at the time the lamina is solidified. The layer with which a lamina is associated, is that layer which corresponds to the dimensionally correct location of the lamina relative to the rest of the object.

Figure 2A:
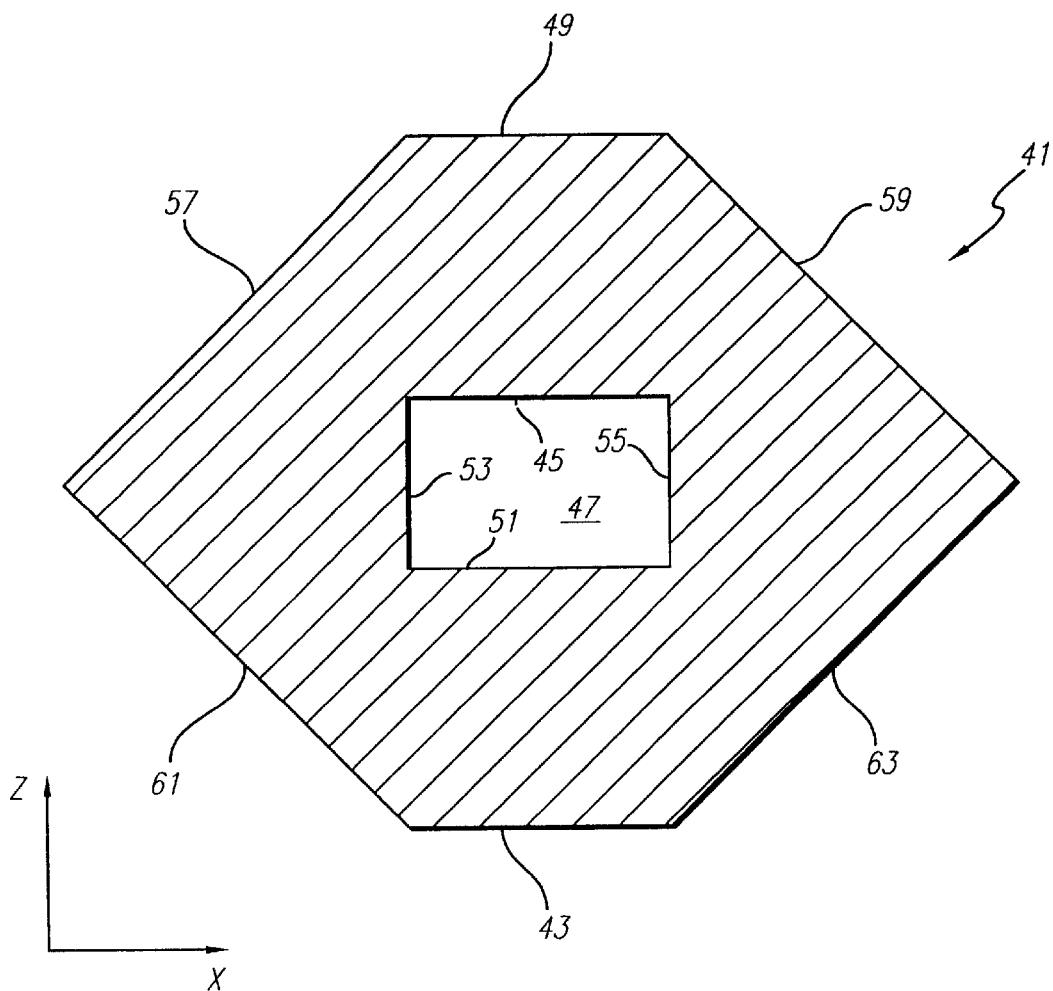
FIG. 2a depicts a side view of an object to be formed using stereolithography

FIG. 2*a* depicts a side view of an object 41 to be produced stereolithographically. In terms of forming horizontal layers, this figure depicts the vertical axis (Z) and one of the horizontal axes (X). This object will be used to illustrate some aspects of a preferred embodiment and alternative embodiment of the instant invention. This object includes two horizontal (i.e. flat) down-facing features: one at the bottom 43 of the object and the other at the upper edge 45 of the hole 47 through the middle of the object. Similarly, this object includes two horizontal (i.e. flat) up-facing features: one at the top 49 of the object and the other at the lower edge 51 of the hole 47 through the middle of the object. This object includes two vertical walls 53 and 55 located on either side of hole 47. This object also includes two non-horizontal (sometimes called, near flat) up-facing regions 57 and 59 located on either side of the object and two non-horizontal down-facing regions 61 and 63 located on either side of the object.

Figure 2B:
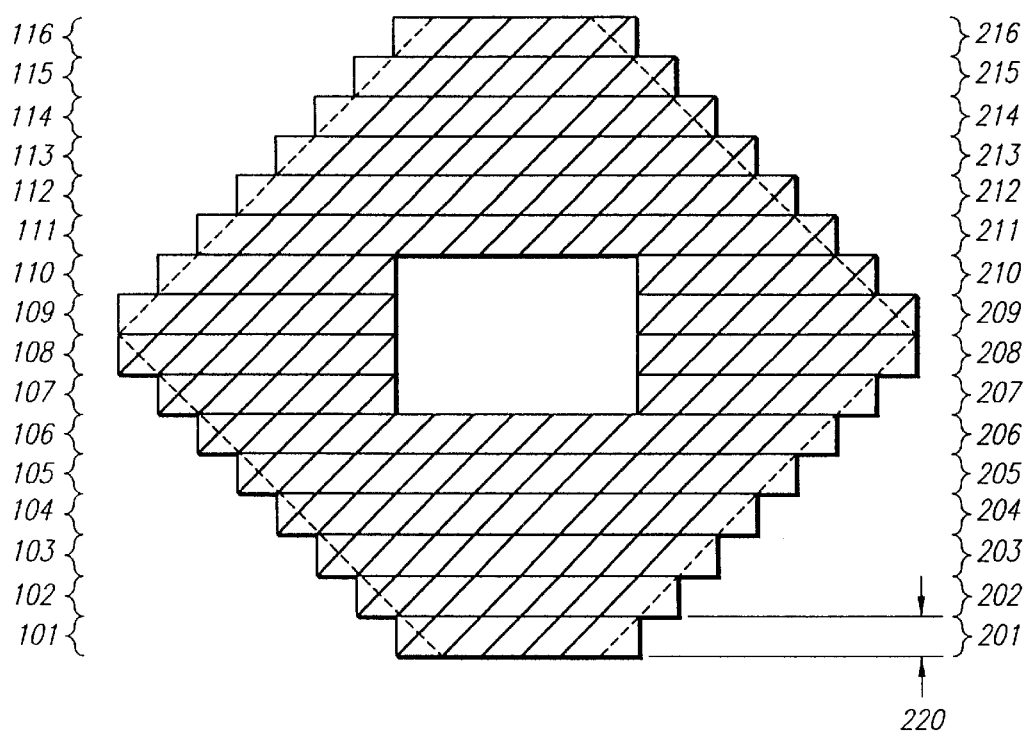
FIG. 2b depicts a side view of the object of FIG. 2a formed using a strict layer-by-layer build up technique.

FIG. 2b illustrates the object as it might be formed with a desired resolution using stereolithography wherein the minimum solidification depth, MSD, and minimum recoating depth, MRD, (discussed in U.S. Pat. Nos. 5,597,520 and 5,902,538 of the material are both less than or equal to the desired layer thickness (i.e. resolution). In this example, the thickness 220 of each layer is the same. As indicated, the object is formed from 16 adhered laminae 101–116 and 16 associated layers of material 201–216. As layers are typically solidified from their upper surface downward, it is typically to associate cross-sectional data, lamina and layer designations with the upper extent of their positions. To ensure adhesion between laminae, at least portions of each lamina are typically provided with a quality of exposure that yields a cure depth of more than one layer thickness. In some circumstances use of cure depths greater than one layer thickness may not be necessary to attain adhesion. To optimize accuracy it is typical to manipulate the object data to account for an MSD greater than one layer thickness or to limit exposure of down-facing regions so that they are not cured to a depth of more than one layer thickness.

A comparison of FIG. 2a and 2b indicates that the object as reproduced in this example is oversized relative to its original design. Vertical and Horizontal features are positioned correctly; but those features which are sloped or near flat (neither horizontal nor vertical), have solidified layers whose minimal extent touches the envelope of the original design and whose maximum extent protrudes beyond the original design. Further discussion of data association, exposure, and sizing issues can be found in U.S. Pat. Nos. 5,184,307 and 5,321,622 as well as a number of other patents referenced above.

Figure 2C:
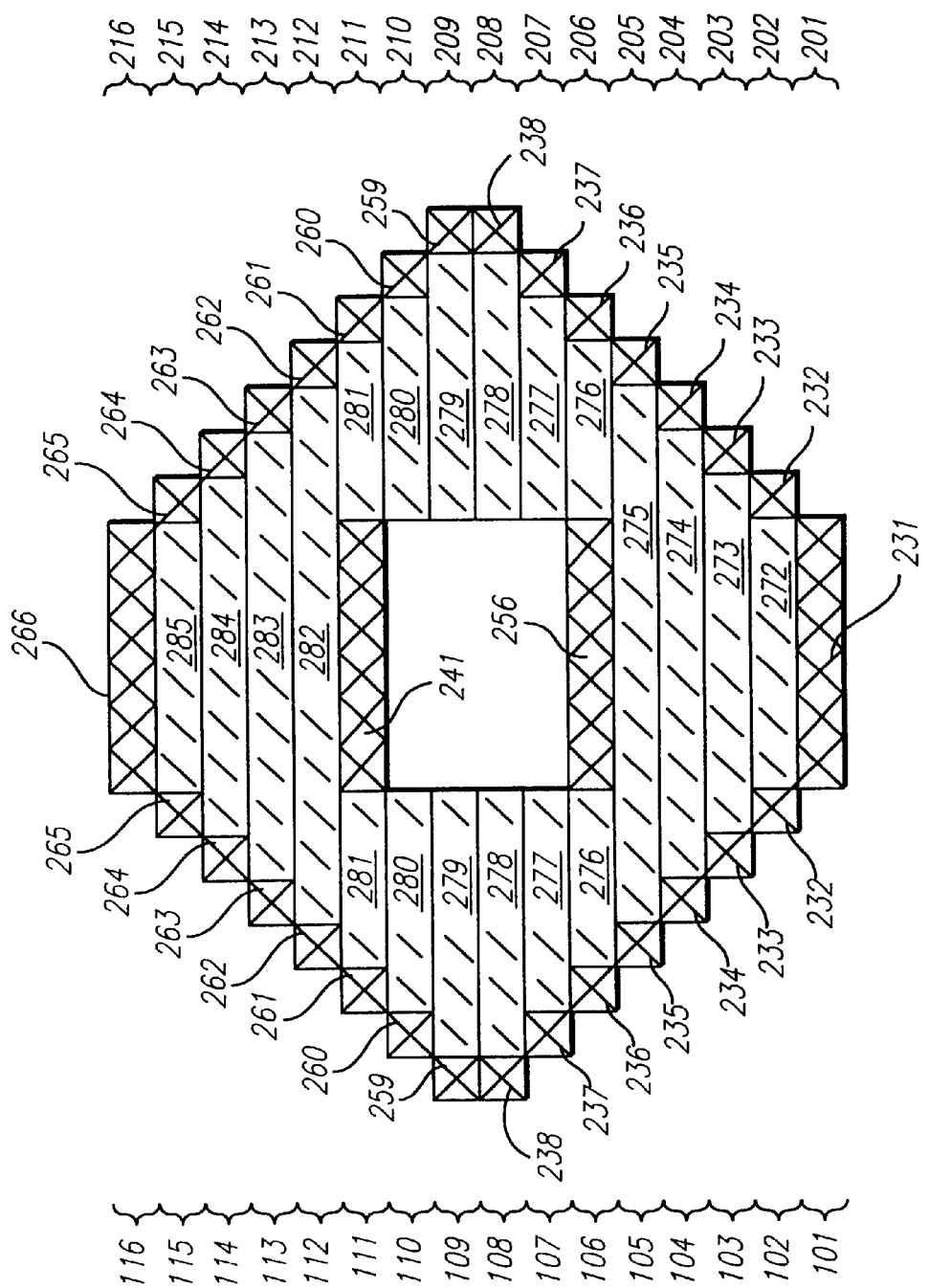
FIG. 2c depicts a side view of the object of FIG. 2b where the different exposure regions associated with each layer are depicted.

FIG. 2c depicts the object as produced in FIG. 2b but with various regions of the object and object laminae distinguished. In one classification scheme (as described in U.S. Pat. No. 5,321,622) each lamina of the object can be made up of one, two or three different regions: (1) down-facing regions; (2) up-facing regions, and (3) continuing regions (i.e. regions that are neither down-facing nor up-facing). In this scheme, the following eight vector types might be utilized though others may be defined and used:

Down-facing boundaries—Boundaries that surround down-facing regions of the object.
Up-facing boundaries—Boundaries that surround up-facing regions of the object.
Continuing boundaries—Boundaries that surround regions of the object that are neither up-facing nor down-facing
Down-facing Hatch—Lines of exposure that are positioned within the down-facing boundaries. These lines may be closely or widely spaced from one another and they may extend in one or more directions.
Up-facing Hatch—Lines of exposure that are positioned within the up-facing boundaries. These lines may be closely or widely spaced from one another and they may extend in one or more directions.
Continuing Hatch—Lines of exposure that are positioned within continuing boundaries. These lines may be closely or widely spaced from one another and they may extend in one or more directions.
Down-facing Skin/Fill—Lines of exposure which are positioned within the down-facing boundaries and closely spaced so as to form a continuous region of solidified material.
Up-facing Skin/Fill—Lines of exposure which are positioned within the up-facing boundaries and closely spaced so as to form a continuous region of solidified material.

Taken together, the down-facing boundaries, down-facing hatch and down-facing fill define the down-facing regions of the object. The up-facing boundaries, up-facing hatch, and up-facing fill, define the up-facing regions of the object. The continuing boundaries and continuing hatch define the continuing regions of the object. As down-facing regions have nothing below them to which adhesion is desirably achieved (other than possibly supports), the quantity of exposure applied to these regions typically does not include an extra amount to cause adhesion to a lower lamina though extra exposure might be given to appropriately deal with any MSD issues that exist. As up-facing and continuing regions have solidified material located below them, the quantity of exposure applied to these regions typically includes an extra amount to ensue adhesion to a lower lamina.

TABLE 2

Object Regions Existing on Each Lamina of FIG. 2c

| Lamina & Layer | Down-Facing Region(s) | Up-Facing Region(s) | Continuing Region(s) |
| --- | --- | --- | --- |
| 101, 201 | 231 | | |
| 102, 202 | 232 | | 272 |
| 103, 203 | 233 | | 273 |
| 104, 204 | 234 | | 274 |
| 105, 205 | 235 | | 275 |
| 106, 206 | 236 | 256 | 276 |
| 107, 207 | 237 | | 277 |
| 108, 208 | 238 | | 278 |
| 109, 209 | | 259 | 279 |
| 110, 210 | | 260 | 280 |
| 111, 211 | 241 | 261 | 281 |
| 112, 212 | | 262 | 282 |
| 113, 213 | | 263 | 283 |
| 114, 214 | | 264 | 284 |
| 115, 215 | | 265 | 285 |
| 116, 216 | | 266 | |

Other schemes for region identification and vector type creation are described in various patents and applications referenced above, including U.S. Pat. Nos. 5,184,307; 5,209,878; 5,238,639; 5,597,520; 5,943,235; 5,902,538 and application Ser. No. 08/855,125. Some schemes might involves the use of fewer designations such as: (1) defining only outward facing regions and continuing regions where down-facing and up-facing regions are combined to form the outward facing regions; (2) combining all fill types into a single designation; or (3) combining up-facing and continuing hatch into a single designation or even all three hatch types into a single designations. Other schemes might involve the use of more designations such as dividing one or both of the up-facing and down-facing regions into flat regions and near-flat regions.

Other region identifications might involve the identification of which portions of boundaries regions associated with each lamina are outward facing and/or interior to the lamina. Outward facing boundary regions are associated with the Initial Cross-Section Boundaries (ICSB). The ICSB may be considered the cross-sectional boundary regions existing prior to the cross-sections into the various desired regions. ICSBs are described in U.S. Pat. Nos. 5,321,622 and 5,597,520. Interior boundaries are bounded on both sides by object portions of the lamina whereas outward boundaries are bounded on one side by an object portion of the lamina and on the other side by a non-object portion of the lamina.

The starting point for implementation of the instant invention need not be the data associated with a strict layer-bylayer building process as illustrated in FIG. 2b and 2c. The starting point may be initial or modified three-dimensional object data that has not yet been converted to cross-sectional data. Furthermore, it may be modified cross-sectional data descriptive of laminae that will not be formed on a strict layer-by-layer basis. For example, the starting point may be surface or cross-sectional data that has been modified to accommodate for an MSD and/or an MRD that is greater than one layer thickness.

A first preferred embodiment of the instant invention involves the formation of three-dimensional objects using a first beam having a first diameter and a second beam having a second diameter that is larger than the diameter of the first beam. The smaller of the beams is referred to herein as the "small spot", while the larger of the beams is referred to herein as the "large spot". This first embodiment involves a data manipulation technique for determining which portions of each cross-section should be formed with each beam. FIG. 3 depicts a flow chart illustrating the preferred data manipulation process for the first embodiment.

In this embodiment support data is considered to always be formed using the smaller spot as the preferred support structures are typically of narrow dimension. These support structures are further described in U.S. Pat. No. 4,999,143. This assumption about the support structure is advantageous in that it reduces data manipulation time with little or no impact on the beam size use conclusions.

The process begins with the initial data and parameters set forth in elements 300, 302, and 304. Element 300 calls for supplying data representing the object or objects to be formed. Element 302 sets a looping parameter for variable "N" equal to one. The variable "N" is used to designate the cross-section for which large spot and small spot data is being derived. Since the process begins with N=1, the process starts with the first cross-section of object data. Element 304 calls for providing all necessary parameters for use in deriving cross-sectional data.

These parameters include but may not be limited to specification of large spot compensation information (LSCI) and small spot compensation information (SSCI). This information may be obtained in a number of ways. Several examples include: (1) obtaining it from a storage location on already existing in the process computer or other computer, (2) it may be automatically derived from beam profile detection and evaluation, (3) it may be input by an operator. The compensation information may be in the form of beam diameter or radius, full or half line width associated with a line of desired cure depth formed by the beam, or the like.

Element 306 makes use of the data and parameters supplied by elements 300, 302, and 304. Element 306 calls for the derivation of initial cross-section boundaries (ICSB) for cross-sections N−1, N, and N+1. These cross-sections are preferably compensated for the estimated line width associated with use of the smaller beam. These initial cross-section boundaries are labeled as ICSB(N−1), ICSB(N), and ICSB(N+1), respectively. The procedure used by this element may be that described in U.S. Pat. No. 5,321,622.

Element 308 calls for the setting of a variable "I" to a value of 1. This variable is used as a marker for designating which cross-sectional region is being operated upon. Element 310 calls for derivation of a cross-sectional region RB(I) corresponding variable "I" based on ICSB(N). Variable "I" can take on values from 1 to 3, each corresponding to one of (1) down-facing regions, (2) up-facing regions, or (3) continuing regions.

Element 312 calls for deriving initial large spot data, ILSD(I), by performing an erosion routine on RB(I) using large spot compensation information, LSCI. This LSCI is preferably equal to one half the line width associated with the using the large spot. Techniques for performing erosion operations (e.g. line width compensations) are provided in previously referenced U.S. Pat. Nos. 5,321,622; 5,184,307; and 5,965,079 and U.S. patent application Ser. No. 09/484,984. This element is used to ensure that formation of the large spot region will not adversely impact the XY dimensions of the region.

Element 314 calls for deriving final large spot data FLSD(I). This derivation occurs based on taking the Boolean intersection of the areas occupied by the initial large spot data for region (I) and the boundary for region (I). This element is used to ensure that the derivation of the ILSD(I) did not inadvertently result a region or regions of excess size. The operation may be expressed as, $$FLSD(I) = ILSD(I) \cap RB(I).$$

Element 316 calls for deriving expanded large spot data, ELSD(I), by performing an inverse erosion (i.e. an expansion) using LSCI. The amount of inverse erosion is preferably equivalent to the original erosion amount used in element 312. With the exception of portions of the region that collapsed in response to the erosion of element 312, the reverse erosion of element 316 brings the expanded large spot data ELSD(I) boundary back to approximately the position of the original region data RB(I).

Element 318 calls for deriving initial small spot data ISSD(I) by taking the Boolean difference between the area of original region data RB(I) and the area of the expanded large spot data, ELSD(I). This may be expressed as, $$ISSD(I) = RB(I) - ELSD(I).$$

Element 318 in combination with element 316 provides a first step in reducing unnecessary small spot exposures that may otherwise be called for.

Element 320 calls for deriving first modified small spot data, FMSSD(I), by performing an erosion routine based on small feature compensation information, SFCI. The amount of the erosion is set based on a desire to remove small features of a certain size. These small features may inadvertently result from the prior operations or may simply be small features that may be ignored when determining which areas to expose with the small spot. The erosion amount may be set at or above one half the desired feature size that is to be removed. The erosion amount may be set equal to the one half the line width obtained when using the small spot.

Element 322 calls for deriving second modified small spot data, SMSSD(I) by performing an inverse erosion routine based SFCI. The amount of the inverse erosion is preferably identical to the amount used in step 320. Element 320 and 322 provide a second way of reducing unnecessary small spot exposures that may otherwise be called for.

Element 324 calls for deriving the final small spot data, FSSD(I). This operation is preferably performed by taking the intersection of the second modified small spot data, SMSSD(I), with the original region data, RB(I). This element is provided in order to ensure that the derivations leading up to the SMSSD(I) have not produced a region of excess size. The derivation of this element may be expressed as, $$FSSD(I) = SMSSD(I) \cap RB(I).$$

Element 326 makes the enquiry as to whether the value of "I" equals three. As noted previously, in this embodiment the maximum value of "I" is three. The first pass through sets 310–324 is used to produce large spot data and small spot data for one of the possible cross-section regions. This region may be, for example, the down-facing region for cross-section N. If the value of I, is the equal to three, element 326 causes the process to proceed to element 330 which increments the value of "I" by one. The process then repeats elements 310 to 324 for a next cross-sectional region to derive a large and small spot data for this next region (e.g. up-facing regions or continuing regions). This looping through elements 310 to 324 is continued until large spot and small spot data is generated for each of the applicable regions.

Once large and small spot data is derived for all three regions, the process proceeds to element 328. Element 328 calls for saving the final large spot data for each of the three regions (for exposure using the large spot), the final small spot data for each of the three regions (for exposure using the small spot), and saving the initial cross-section boundary for cross-section N (for exposure using the small spot). The utilization of a complete trace of the overall cross-sectional perimeter (ICSB) perimeter(s) by the small spot may perform one or more of several functions: (1) it may help to tie together the independent formed regions, (2) it may help to give the outer surface a smoother appearance, and/or (3) it may help increase the accuracy of the perimeter region.

Though not explicitly indicated in the flow chart, if there is no data for a particular region, the execution of elements 310–324 for that region may be skipped such that the process jumps to element 326. If no region data RB(I) exists for particular region type, the process will simply produce no large or small spot data for that region of the cross-section.

Next, element 332 inquires as to whether N equals the maximum value of N. If the answer in element 332 is "no", N is incremented by one, per element 338, and the process loops back through steps 306–330. If the answer in 332 is "yes", element 334 calls for the saving of all data in the proper order for object formation. Once the data is saved, element 336 indicates that the process is complete.

Figure 4A:
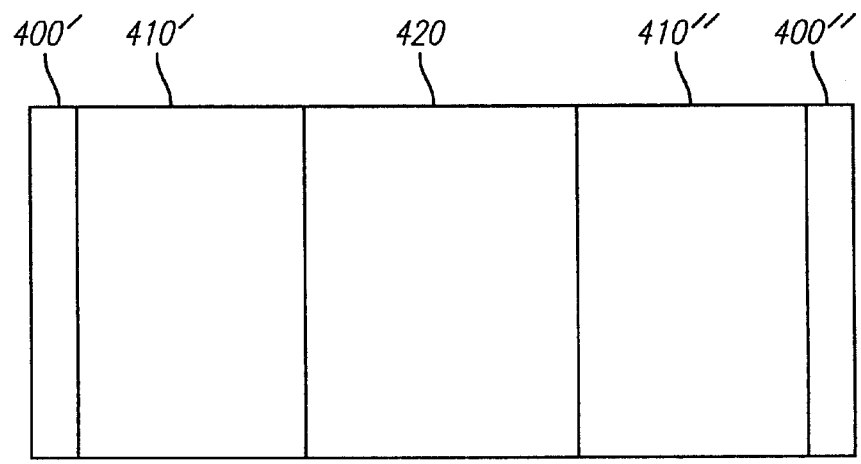
FIG. 4a depicts a top view of cross-section 106 of FIG. 2c including each of the different exposure regions.
Figure 4B:
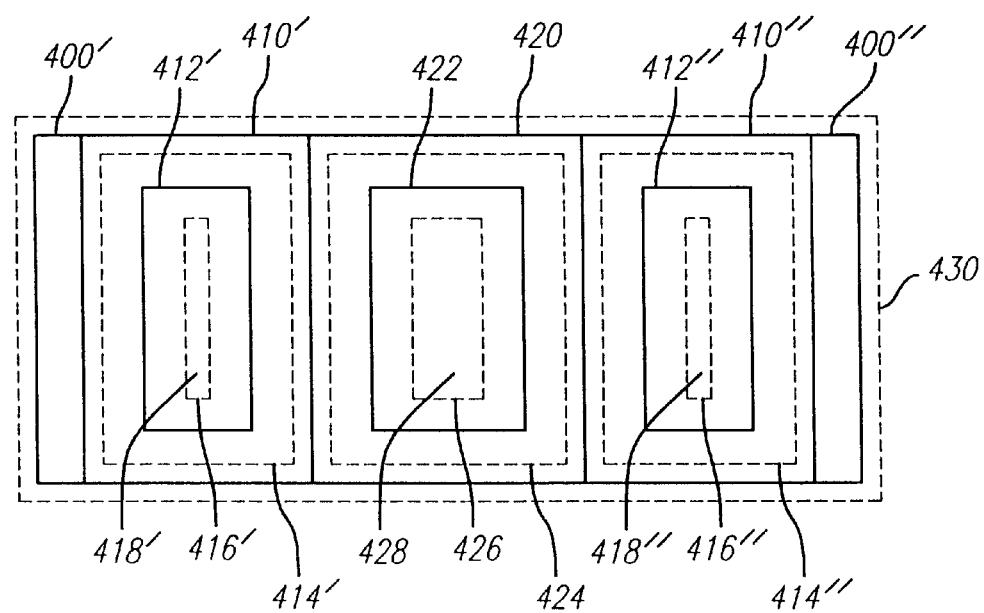
FIG. 4b depicts a top view of cross-section 106 of FIG. 2c wherein each region of the cross-section has been divided into large spot and small spot regions.

The application of this process to an object cross-section is illustrated with the aid of FIGS. 4a and 4b. FIG. 4a depicts a top view of lamina/cross-section 106 of FIG. 2c. This lamina/cross-section is indicated in FIG. 2c and 4a as containing five distinct regions. FIG. 2c labels these regions from left to right as 236, 276, 256, 276, and 236, while FIG. 4a labels these regions as 400', 410', 420, 410", and 400", respectively. Regions 400' and 400" are down-facing regions. Regions 410' and 410" are continuing regions, and region 420 is an up-facing region. According to this first preferred embodiment each of these regions will be independently supplied with large spot portions (to the extent possible) and small spot portions.

FIG. 4b illustrates that regions 410', 420, and 410" are of sufficient size to allow large spot boundaries to be identified respectively as 412', 422, and 412", while regions 400' and 400" are too small to have any portion of them formed using the large spot (based on the assumed line widths used). The region between lines 414' and 416' will be formed upon tracing the boundary 412' with the large spot beam. Line 414' may be very close to boundary 410' depending on whether elements 312 and 316 of FIG. 3 were performed using identical or substantially identical compensation amounts. The region 418' interior to the loop formed by line 416' will be filled in, as desired, by the large spot beam tracing hatch vectors. The same respective situation holds for elements 414", 416", and 418". The situation is also analogous for elements 424, 426, and 428. The loop formed by line 430 indicates the widening of the cross-sectional dimensions as the outer perimeter of the cross-section (which corresponds to ICSB(N)) is traced with the small spot beam. This inherent widening illustrates impetus for having the ICSB(N) initially compensated inward by one half the line width associated with the small spot.

In this first preferred embodiment the small spot is preferably about 10 mils in diameter while the larger spot is about 30 mils in diameters. As the small beam will be used in the formation of the external boundaries of a cross-section, it is preferred that the small spot beam be focused at or near the working surface such that the beam remains substantially in focus over the entire working surface of the building material. In other words, to ensure minimal change in beam size, while using the small spot with rotational scanning mirrors, it is desired that small spot exposure occur using the beam waist. The large beam may be used in an off focus state as slight size variations in the beam at different locations on the working surface will have little or no impact on the accuracy of the objects formed. However, for optimal performance, it is preferred to have both bees focused on the surface of the material (i.e. beam waist at surface of the material). Placing the beam waist of the second beam at the material surface may occur in many ways. As a single example, a moving carriage could translate lenses 83' and 83" as lens 83'" is moved to obtain a different spot size on the material while maintaining the beam waist at the material surface as well.

Many alternatives of the techniques of the first embodiment are possible. Examples of some alternatives are provided below. These examples are only intended to be illustrative and not a complete listing. Numerous other alternatives will be apparent to those of skill in the art upon reviewing the disclosure herein.

Instead of basing the derivation of large spot and small spot regions on boundary data as preferred in the first embodiment, the derivation may be based on pixel data, voxel data, run length encoded data, or other data types. Boolean operations, erosion operations, and/or other operations may be performed using bit maps, or the like.

Element 306 may use boundaries that are not compensated for line width wherein required compensation could be performed at a later stage of processing. As a further alternative the compensation may not be performed at all especially if a final spot boundary is not intended to trace the entire cross-sectional perimeter.

Elements 306 and/or 310 may be performed in a modified manner if it is desired to compensate for a minimum solidification depth, MSD, that is greater than one layer thickness. Similarly, elements 306 and/or 310 may be modified to account for build process changes that deal with minimum recoating depth, MRD issues. Procedures for deriving data that accommodates for MSD and/or MRD values greater than one layer thickness may be found in U.S. Pat. Nos. 5,999,184 and 5,902,538.

Element 312 may use an erosion amount different from one half the line width. It may, for example use an amount that is larger than one half the line width. It may be as small as the one half the difference between the large spot line width and the small spot line width. This is most particularly a possibility when the original ICSB is initially compensated inward by the one half the small spot line width. If this limited amount of compensation is used, the external edges of the large spot solidified region will approximately match the external edges of the small spot solidified regions with the exception of possibly some external corner regions wherein the large spot may be pulled inward from the desired boundary. If this limited amount of compensation is used the exposure of a small spot cross-sectional perimeter may become unnecessary in some circumstances.

Element 314 may be eliminated. This will result in reduced processing time and for a given situation may result in little or no loss in part quality.

Element 316 may use a compensation amount different from that originally used. For example, the compensation amount may be smaller than that originally used. If a smaller amount of compensation is used, element 318 will produce a larger region for small spot exposure. The expanded portion of the small spot region may result in excess exposure of a portion of the regions exposed by the large spot. If this extra exposure is limited to a small region (e.g. from a mil or two up to 10 mils or so), it may not result in too much excess cure depth and may have the advantage of ensuring better more reliable exposure of the boundary portion between the large and small spot exposure zones. The compensation amount may be larger than that used in step 312, for example by 1–3 mils, to minimize unnecessary small spot exposures that might result from rounding errors and other imperfection in the operations.

Element 316 may be completely eliminated wherein element 318 would utilize the difference between the RB(I) and either the FLSD(I) or the ILSD(I). Elements 320 and 322 may both be eliminated. Alternatively, different compensation amounts may be used in each element. In particular the compensation of the inverse erosion of Element 322 may be based on a smaller compensation amount that was used in Element 320. This smaller amount (e.g. one-quarter to three-quarters as much) could be used to keep a portion of the FMSSD(I) from being excessively exposed during the final perimeter tracing. This might even result in a better surface perimeter surface that for some objects than would result from the techniques of the first embodiment.

Element 324 calls for the maximum value of "I" to be three. In other embodiments, smaller numbers of cross-sectional regions may be used. In still further embodiments larger number of cross-sectional regions may be used. For example, the maximum value of "I" may be one, in which case RB(I)=RB(1)=ICSB(N). As a second example, the maximum value of "I" may be two, wherein the cross-section may be divided into continuing regions and outward facing regions (i.e. a combination of up-facing and down-facing regions). Alternatively, the cross-section may be divided into down-facing regions and non-down-facing regions. As a third example, the maximum value of "I" may be five, wherein the cross-section may be divided into flat down-facing, near-flat down-facing, flat up-facing, near-flat up-facing, and continuing regions. Of course many other values of "I" are possible along with designation of many different region types.

Figure 5A:
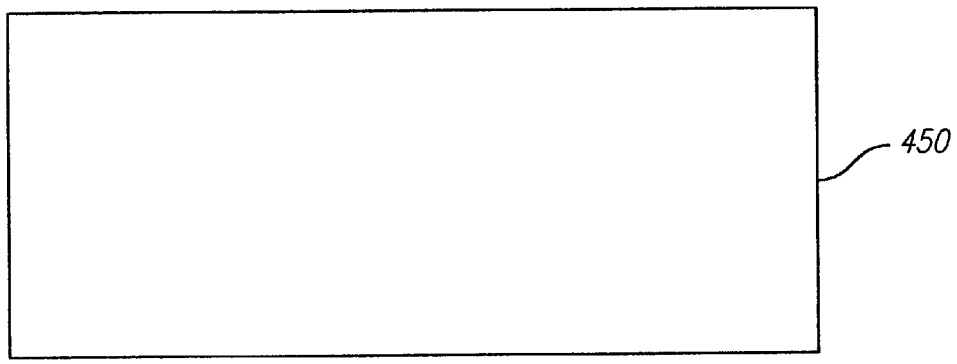
FIG. 5a depicts a top view of cross-section 106 of FIG. 2b.
Figure 5B:
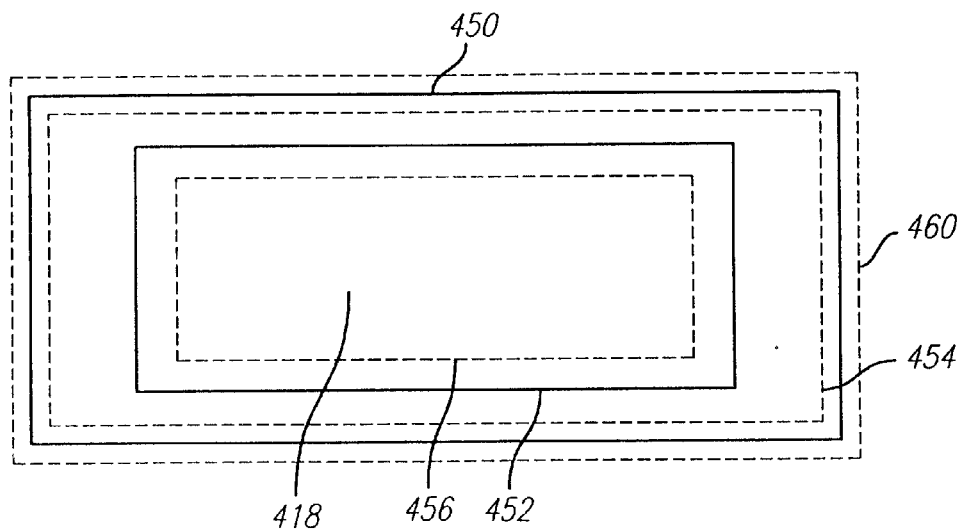
FIG. 5b depicts a top view of cross-section 106 of FIG. 2b wherein the cross-section has been divided into large spot and small spot regions.

FIGS. 5a and 5b illustrate large and small spot regions where "I" is set equal to one. FIG. 5a depicts a top view of the boundary 450 for cross-section 106 of FIG. 2b where the cross-section is not divided into separate regions. FIG. 5b depicts a large spot boundary 452 offset from boundary 450 by a desired amount. Line loops 454 and 456 depict the region that will be exposed when tracing the large spot boundary 452. Area 418 will be exposed by tracing the large spot to form hatch or fill. Line loop 460 depicts the widening of the cross-sectional dimension when boundary 450 is traced using the small spot beam.

Element 332 may be eliminated if the data is saved in the right order in element 328 or at some other point in the process.

While the preferred source of both large and small spot prescribed stimulation is a beam produced by a single laser, other options exist: (1) two or more lasers may be used, or (2) one or more non-laser sources may be used. The present invention uses a pulsed laser source but it is also possible to use a continuous wave CW source as well.

When forming a single lamina, it may be desirable to minimize the number of transitions between large spot and small spot drawing. As such it may be advantageous to draw all large spot vectors first, followed by all small spot vectors.

A single transition can still occur during the formation of each lamina, if a portion of the small spot or large spot regions are exposed first, followed by the formation of all portions using the opposite sized beam, and then completing the lamina formation with original sized beam. This alternative has the disadvantageous of changing the spot size during what could otherwise be an exposure time.

As it may take a second or two to change the spot size it is preferred that this be done during a period when exposure can not occur, such as for example, during recoating, z-wait, pre-dip delay, even during mid-exposure delays, such as an inter-hatch delay or a hatch-to-boundary delay periods. These mid-exposure delays are described in U.S. patent application Ser. No. 09/246,504.

It is believed that the last drawn vectors will hold their X and Y positions better, as such it is preferred that the small spot perimeter be formed last. It is presently preferred that Large spot vectors be drawn (i.e. exposed) first on a given layer, followed by small spot object exposure, and finally followed by support structure exposure.

Small spot power and large spot power may take on any appropriate values. The actual power applied in each spot may be determined based on one or more parameters: (1) vector type, (2) region, and (3) desired cure depth to be achieved by a single line of exposure or by a series of overlapping exposures. Desired cure depth in turn may be based on a variety of parameters, including layer thickness, vector type, MSD and MRD issues, etc. It is possible that the power of both beams could be the same or even more power could be used in the small spot. Typically, however, the small spot beam will have smaller power.

More information about beam power and modifying it is supplied in U.S. Pat. No. 6,241,934 B1. In particular the power in the small spot may be less than or equal to that used by the large spot. In particular as the small spot is more susceptible to scanning speed limitations based on pulse repetition rate, increasing the pulse repetition may allow higher scanning speeds to be obtained.

As noted above the AOM may be used to control beam power to a desired level. Other techniques for controlling laser power include: (1) a mechanism for variably supplying electric power to a laser diode source that supplies pumping energy to the laser source, (2) a mechanism for variably controlling operation of a Q-switch in the laser source, (3) an electro-optic modulator, (4) a mechanism for variably controlling a pulse repetition rate of the power in the beam, (5) a mechanism for controlling the temperature of a laser diode source that supplies pumping energy to the laser source, (6) a mechanism for controlling a temperature of a frequency conversion crystal through which the beam from the laser source passes, and (7) a computer controlled shutter.

Depending on the detailed resolution of the objects to be formed, small spot diameters may range, from less than 3 mils to more than 50 mils while large spot diameters may range from less than 7 mils to more than 200 mils. The smallest useful beam size depends on the energy pulse, the required overlap per pulse and the net exposure required. It is preferable that the large spot diameter be in the range of 1.5 to 5 times the diameter of the small spot and more preferably about 2.5 to 4 times the size of the small spot. If the disparity in size becomes too large, it may be advantageous to use one or more additional intermediate sized beams.

As beam positioning is generally considered less critical when using the large spot, it is anticipated that higher scans speeds will be possible using the large spot (so long as sufficient laser power is available to supply the right exposure.

In forming lamina using the large spot, use of boundary exposures is optional. When forming objects using a QUICKCAST build style (as described in U.S. Pat. Nos. 5,855,718 and 5,965,079), it is preferred that all hatch vectors be formed using the smaller spot and that use of large spot be limited to skin regions when their size make the large spot applicable.

In an alterative embodiment, the decision to use large spot in favor of small spot may not be solely based on a large spot area existing, it may also be based on a comparison of time to change the spot size versus the savings in exposure time that will be obtained as a result of using the large beam size.

An example preferred implementation using a dual sized beam system is presented herein next. The beam size for the larger beam is preferably about 30 mils and the associated beam power is preferably about 800 mW (for example, 400 mW or greater), the spacing between successive hatch lines is preferably about 15 mils (for example, between 25 and 125% of the beam diameter, and the scanning speed is preferably about 300 ips (for example, 100 ips or greater). The smaller beam preferably has a diameter of approximately 10 mils.

The object is to be formed using a building technique there only portions of some layers are solidified in association with those layers, wherein the remaining portions of the layers are formed in association with subsequent layers. Such techniques are described in U.S. Pat. Nos. 5,902,538, 5,597,520; and 5,209,878. In particular, the object will be formed using two secondary layers located intermediate to successive primary layers (such techniques are described in the '428 application noted above. The separation between each layer (i.e. layer thickness) is 3 mils.

On a first secondary layer, only an outer boundary region is formed using the smaller beam. Up-facing and down-facing regions may also be formed if they exist. The exposure applied to these boundaries preferably results in a cure depth of approximately 15 mils. This boundary is preferably line width compensated by about 5 mils.

On a second secondary layer it is again preferred that only outer boundary regions be formed using the smaller beam. Up-facing and down-facing regions may also be formed in association with this layer if they exist. This boundary is also preferably given a cure depth of approximately 15 mils and is line width compensated by about 5 mils. In an alternative implementation, the boundaries formed in association this layer may be given a cure depth of less than 15 mils. The cure depth used may be dependent on the depth of liquid existing prior to exposure of these boundary regions. For instance, depending on whether or not the outer boundary region of the second secondary layer overlays the boundary formed of the first secondary layer, the depth of liquid prior to exposure may be equal to 3 mils or 6 mils. Thus as the depth of liquid prior to exposure varies it may be preferable to adjust the cure depth associated with these outer boundary regions.

The primary layer above the second secondary layer is preferably formed using the following procedure. First, an inwardly offset boundary is formed using the large beam. This boundary is preferably offset inward from the line width compensated outer boundary position by about 15 mils. The beam preferably provides an exposure such that the large boundary does not adhere to the layer below. This exposure preferably results in a cure depth of 8.

Second, a first pass of hatch is preferably formed within the bounds of the solidified large spot boundary region. This hatch is preferably supplied with an exposure that yields a cure depth of approximately 8 mils. This hatch may also be retracted slightly from the solidified boundary so that no adhesion to the boundary occurs, or alternatively, it may adhere to the boundary. This adhesion to the boundary may occur at all locations along the boundary or at only a portion of the interface region.

Third, a delay period of, for example, 15 seconds preferably occurs. This delay time may be occupied by drawing other object regions or simply may be a wait period.

Fourth, a second exposure of hatch is preferably applied. This hatch is preferably oriented in a direction perpendicular to the direction of the first pass of hatch. The quantity of exposure applied on the second pass preferably yields a cure depth of 10 mils. As with the first exposure of hatch, it is preferred that the spacing between each hatch line be such that an overlapping exposure occurs so that a continuously solidified region is formed. Any retraction associated with the second pass of hatch is preferably similar to that used on the first pass, for example, 3 mils.

The fifth step involves the use of the small spot to expose an outer boundary for the cross-sectional region. This exposure preferably results in a cure depth of approximately 15 mils. Depending on whether or not this boundary overlays the boundary on the previously formed secondary layers, the depth of liquid prior to exposure may be equal to approximately 3 mils to 9 mils. For a shallower depth of liquid prior to exposure, it may be preferable to decrease the cure depth for the outer boundary region. This outer boundary may be line width compensated by approximately 5 mils.

With the execution of the fifth step, the exposure of the primary layer is completed. In alternative implementations, additional exposure of hatch, and/or skin fill, and/or supports using the small spot may occur prior to or after the exposure of the small spot outer boundary. In addition, there may be exposure of skin fill using the large spot before or after the second pass of hatch with the large spot, but preferably before the exposure of the outer boundary with the small beam.

Once exposure of the primary lamina is accomplished, object formation continues with the repeated formation and exposure of groups of primary and secondary layers until the object is completed. Further appreciation of object formation using secondary layers and primary layers may be gathered from a review of U.S. Pat. No. 5,902,538. The procedure described above is summarized in Table 3. The parameters used for the formation and exposure of the three layers of the set are provided in Table 4.

TABLE 3

Formation of a Set of Primary and Secondary Layers.

Action

Form first secondary layer
Draw boundary region of first secondary layer
Form second secondary layer
Draw boundary region of second secondary layer
Form primary layer TABLE 3-continued Formation of a Set of Primary and Secondary Layers.

| Action |
| --- |
| Draw inner boundary of primary layer using larger beam |
| Draw first pass of hatch of primary layer using larger beam |
| Delay occurs between the two passes of hatch of the primary layer |
| Draw second pass of hatch of primary layer using larger beam |
| Draw outer boundary of primary layer using smaller beam |

TABLE 4

Parameters used for formation and exposure of layers the primary and secondary layers.

| Parameter | Approximate Value Used |
| --- | --- |
| Layer Thickness, Primary and Secondary Layers | 3 mils |
| Boundary Cure Depth, Secondary Layers | 15 mils |
| Boundary Line Width Compensation, Secondary Layers | 5 mils |
| Inner Boundary Cure Depth, Primary Layer | 8 mils |
| Inner Boundary Offset, Primary Layer | 15 mils |
| First Hatch Pass Cure Depth, Primary Layer | 8 mils |
| First Hatch Pass Retraction, Primary Layer | 3 mils |
| Delay, Primary Layer | 15 seconds |
| Second Hatch Pass Cure Depth, Primary Layer | 10 mils |
| Second Hatch Pass Retraction, Primary Layer | 3 mils |
| Outer Boundary Cure Depth, Primary Layer | 15 mils |
| Outer Boundary Line Width Compensation, Primary Layer | 5 mils |

Though the disclosure is primarily directed to vector scanning the technique of the instant invention are applicable to raster scanning systems or combination systems where raster scanning is sometimes used and vector scanning is sometimes used.

Apparatus may be formed by implementing the methods described herein by using a computer memory to receive and store data and processor circuitry to manipulate the data. The memory and processor may be part of an SLA control computer. The processor may be controlled by software or hard coding. Alternatively, implementation may occur without modifying some of the data, but instead by programming the SLA to modify the way the system interprets existing data.

The methods and apparatus in these embodiments and their alternatives can be modified according to various teachings in the above incorporated patents and applications. It is believed that the teachings herein can be applied to other RP&M technologies to more rapidly form objects.

Though particular embodiments have been described and illustrated and many alternatives proposed, many additional embodiments and alternatives will be apparent to those of skill in the art upon review of the teachings herein. As such, these embodiments are not intended to limit the scope of the invention, but instead to be exemplary in nature.

We claim:

1. A method of forming a three-dimensional object from a plurality of adhered laminae by exposing successive layers of a material to a beam of prescribed stimulation, comprising:

providing data representing a three-dimensional object;

providing a first beam of prescribed stimulation having a first dimension;

providing a second beam of prescribed stimulation having a second dimension that is larger than the first dimension, the first beam aid second beam being produced by the same laser light source and having an aspect ratio of between approximately 0.9 and 1.1;

manipulating the data to form modified object data for forming the three-dimensional object, the modified data including data indicative of cross-sectional portions to be formed using the beam having the second dimension and indicative of cross-sectional portions to be formed using the beam having the first dimension;

forming a layer of material adjacent to any last formed layer of material in preparation for forming a subsequent lamina of the object;

exposing the material to the first beam and/or the second beam in accordance with the modified data to form a successive lamina of the object; and repeating the acts of forming and exposing a plurality of times in order to form the object from a plurality of adhered laminae.

2. The method of claim 1 wherein the data manipulation includes use of an erosion routine in determining which portions of a lamina are to be formed using the second beam.

3. The method of claim 2 wherein the data manipulation includes a Boolean intersection operation in determining which portions of a lamina are to be formed using the second beam.

4. The method of claim 3 wherein the data manipulation includes an inverse erosion routine applied to the portion that will be exposed using the second beam in the process of determining which portions of the lamina will be formed using the first beam.

5. The method of claim 4 wherein the data manipulation includes a differencing operation in determining which portions of a lamina are to be formed using the first beam.

6. The method of claim 5 wherein the data manipulation excludes features smaller than a preset limit during the process of determining which portions of a lamina are to be formed using the first beam.

7. The method of claim 1 wherein the portions to be exposed with the second beam are determined prior to determining the portions to be formed using the first beam.

8. The method of claim 1 wherein determination of a first portion to expose using the first beam and a second portion to expose using the second beam are based on a region that does not include the entire cross-sectional area of the lamina.

9. The method of claim 8 wherein the region includes one of an up-facing region, a down-facing region, or a continuing region.

10. The method of claim 1 wherein the laser light source is made to produce more optical power when the second beam is exposing the material than when the first beam is exposing the material.

11. The method of claim 1 wherein the second dimension is 1.5 or more times larger than the first dimension.

12. The method of claim 1 wherein the first beam is substantially focused onto the material and the second beam exposes the material outside a beam waist.

13. The method of claim 1 wherein the first beam is substantially focused onto the material and the second beam is substantially focused on the material.

14. The method of claim 1 wherein during formation of a single lamina, the second beam is utilized prior to utilization of the first beam.

15. The method of claim 1 wherein the second beam is used to form at least two of boundaries, hatch, and fill for regions of the lamina.

16. An apparatus for forming a three-dimensional object from a plurality of adhered laminae by exposing successive layers of a material to a beam of prescribed stimulation, comprising:

means for receiving data representing a three-dimensional object;

means for providing a first beam of prescribed stimulation having a first dimension and means for providing a second beam of prescribed stimulation having a second dimension that is larger than the first dimension, and the first dimension and the second dimension have an aspect ratio of between approximately 0.9 and 1.1;

means for manipulating the data to form modified object data for forming the three-dimensional object, the modified data including data indicative of cross-sectional portions to be formed using the beam having the second dimension and indicative of cross-sectional portions to be formed using the beam having the first dimension;

means for forming a layer of material adjacent to any last formed layer of material in preparation for forming a subsequent lamina of the object;

means for exposing the material to the first beam and/or the second beam in accordance with the modified data to form a successive lamina of the object; and means for operating the means for forming and the means for in order to form the object from a plurality of adhered laminae.

17. An apparatus for forming a three-dimensional object from a plurality of adhered laminae by exposing successive layers of a material to a beam of prescribed stimulation, comprising:

a memory for receiving data representing a three-dimensional object;

one source for providing a first beam of prescribed stimulation having a first dimension and a second beam of prescribed stimulation having a second dimension that is larger than the first dimension, the first dimension and the second dimension having an aspect ratio of between approximately 0.9 and 1.1;

a computer programmed to manipulate the data to form modified object data for forming the three-dimensional object, the modified data including data indicative of cross-sectional portions to be formed using the beam having the second dimension and indicative of cross-sectional portions to be formed using the beam having the first dimension;

a coating system for forming a layer of material adjacent to any last formed layer of material in preparation for forming a subsequent lamina of the object;

an exposure system for exposing the material to the first beam and/or the second beam in accordance with the modified data to form a successive lamina of the object; and a computer programmed to operate the means for forming and the means for exposing in order to form the object from a plurality of adhered laminae.

18. The method of claim 1 wherein the first beam is used to form at least two of (1) boundaries, (2) hatch and (3) fill for regions of the lamina which are different from the regions formed with the second beam.

19. The method of claim 1 wherein the second dimension and the first dimension have a ratio in the range of 1.5–5.

20. The method of claim 19 wherein the ration is 2.5–4.

* * * * *

UNITED STATES PATENT AND TRADEMARK OFFICE
CERTIFICATE OF CORRECTION

PATENT NO.    : 6,406,658 B1
DATED         : June 18, 2002
INVENTOR(S)   : Manners et al.

It is certified that error appears in the above-identified patent and that said Letters Patent is hereby corrected as shown below:

Column 10,
Line 47, "lens 81' the beam" should read -- lens 81" the beam --.

Column 21,
Lines 33-34, "building technique there only" should read -- building technique where only --.

Signed and Sealed this

Fourth Day of February, 2003

JAMES E. ROGAN
*Director of the United States Patent and Trademark Office*